(12) United States Patent
Bergstra

(10) Patent No.: US 10,452,141 B2
(45) Date of Patent: Oct. 22, 2019

(54) METHOD, SYSTEM AND APPARATUS TO CONDITION ACTIONS RELATED TO AN OPERATOR CONTROLLABLE DEVICE

(71) Applicant: KINDRED SYSTEMS INC., Vancouver (CA)

(72) Inventor: James Sterling Bergstra, Toronto (CA)

(73) Assignee: Kindred Systems Inc., San Francisco, CA (US)

( * ) Notice: Subject to any disclaimer, the term of this patent is extended or adjusted under 35 U.S.C. 154(b) by 388 days.

(21) Appl. No.: 15/281,019

(22) Filed: Sep. 29, 2016

(65) Prior Publication Data
US 2017/0090435 A1 Mar. 30, 2017

Related U.S. Application Data

(60) Provisional application No. 62/235,416, filed on Sep. 30, 2015.

(51) Int. Cl.
*G06F 3/01* (2006.01)

(52) U.S. Cl.
CPC .... *G06F 3/014* (2013.01); *G05B 2219/33321* (2013.01)

(58) Field of Classification Search
None
See application file for complete search history.

(56) References Cited

U.S. PATENT DOCUMENTS 9,443,192 B1\* 9/2016 Cosic ........................ G06N 3/02
9,717,387 B1\* 8/2017 Szatmary ................ A47L 9/009
(Continued)

OTHER PUBLICATIONS

Yen-Chen Liu and Nikhil Chopra, Control of Robotic Manipulators Under Input/Output Communication Delays: Theory and Experiments, IEEE Transactions on Robotics, vol. 28 , Issue: 3 , Jun. 2012, 742-751 (Year: 2012).*
(Continued)

*Primary Examiner* — Kenneth M Lo
*Assistant Examiner* — Istiaque Ahmed
(74) *Attorney, Agent, or Firm* — Seed IP Law Group LLP

(57) ABSTRACT

A method of conditioning one or more actions related to an operator controllable device is disclosed. The method includes receiving one or more action-based instructions representing one or more operator controllable device actions associated with the operator controllable device, and receiving one or more action-oriented time representations representing one or more times associated with the action-based instructions. The method also includes deriving at least one conditioned action-based instruction for a time subsequent to the times represented by the received action-oriented time representations from: the received action-based instructions, and the received action-oriented time representations. The conditioned action-based instruction, when executed, causes the operator controllable device to take one or more conditioned actions. The method also includes producing at least one signal representing the conditioned action-based instruction, which when executed, causes the operator controllable device to take the conditioned action. Apparatuses, computer-readable storage media, and systems are also disclosed.

25 Claims, 15 Drawing Sheets

(56) References Cited

U.S. PATENT DOCUMENTS

| | | | | |
|---|---|---|---|---|
| 2002/0188582 | A1* | 12/2002 | Jannarone | G06N 99/005 |
| | | | | 706/26 |
| 2011/0087371 | A1* | 4/2011 | Sandberg | G05D 1/0038 |
| | | | | 700/245 |
| 2012/0323401 | A1* | 12/2012 | McGrogan | B60K 6/365 |
| | | | | 701/1 |
| 2018/0311817 | A1* | 11/2018 | Laurent | B25J 9/163 |

OTHER PUBLICATIONS

Behnke S., Egorova A., Gloye A., Rojas R., Simon M. (2004) Predicting Away Robot Control Latency. In: Polani D., Browning B., Bonarini A., Yoshida K. (eds) RoboCup 2003: Robot Soccer World Cup VII. RoboCup 2003. Lecture Notes in Computer Science, vol. 3020. Springer, Berlin, Heidelberg (Year: 2003).*

* cited by examiner

FIG. 7.1
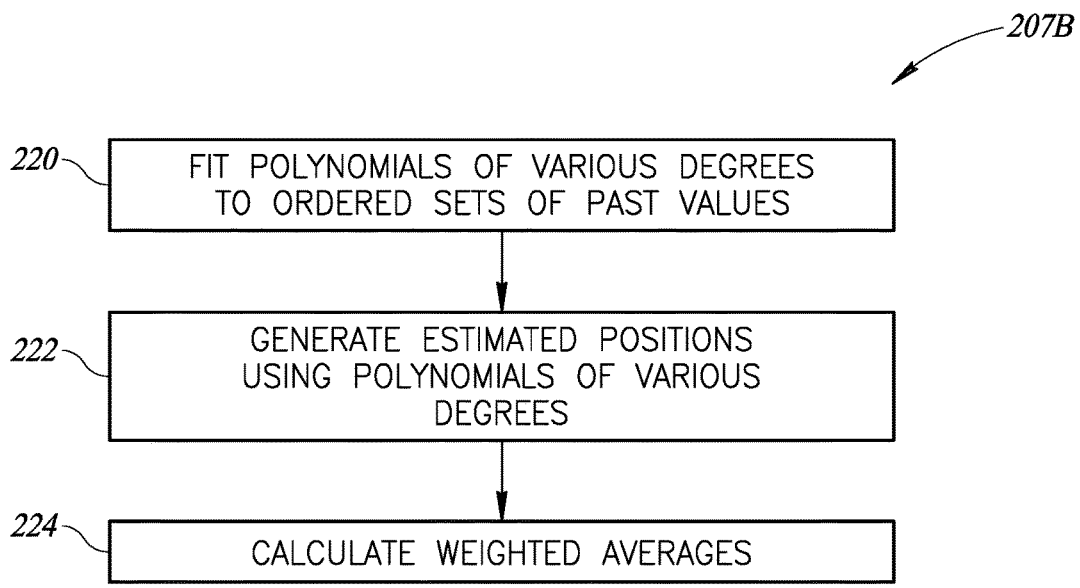
FIG. 7.2
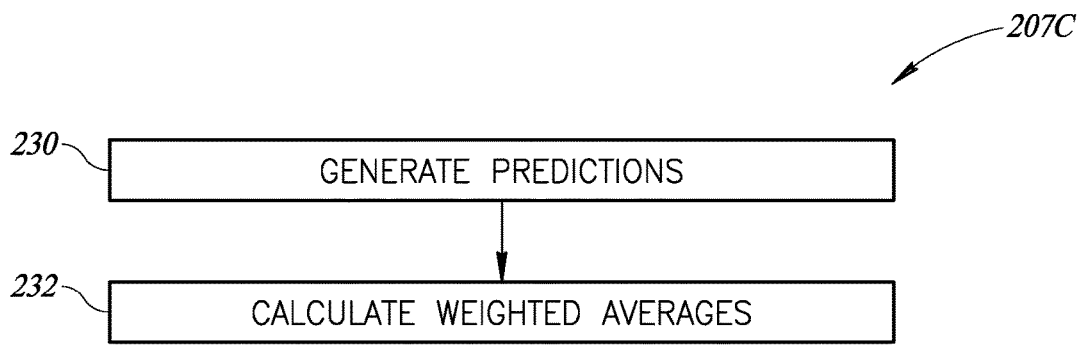
FIG. 7.3

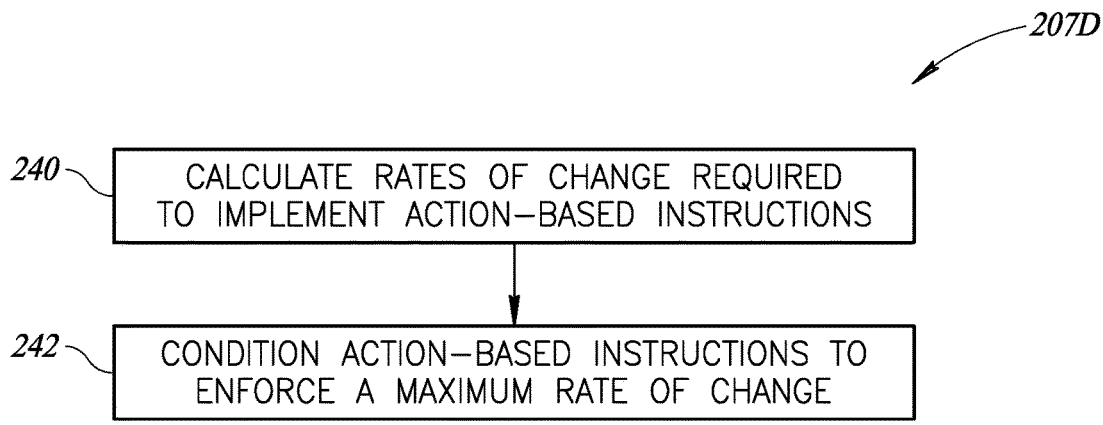
FIG. 7.4
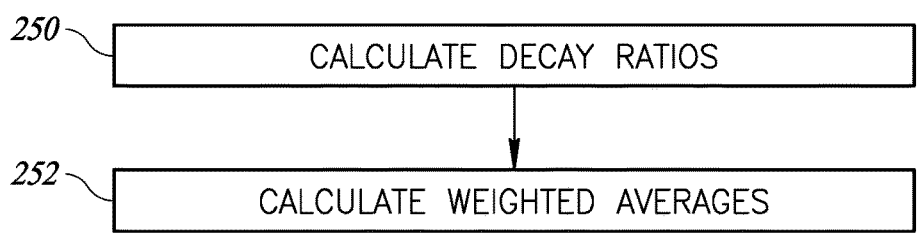
FIG. 7.5
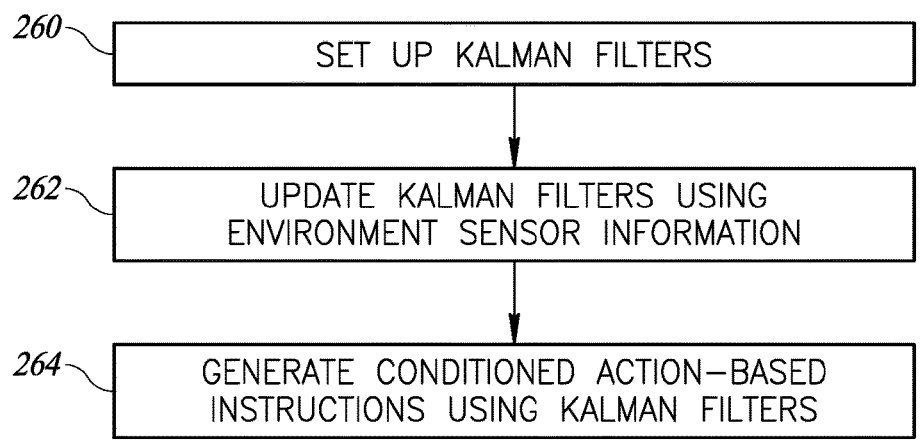
FIG. 7.6

PARTIAL DEVICE CONTROL INFORMATION FRAME RECORD — 530
532 — MOTOR 1     0.644
534 — TIME     1435273535.614

FIG. 9.1.1

POLYNOMIAL COEFFICIENT RECORD — 540
542 — COEFFICIENT 0     0.500
544 — COEFFICIENT 1     0.600
546 — COEFFICIENT 2

FIG. 9.2.1

POLYNOMIAL WEIGHT RECORD — 550
552 — DEGREE 0     0.3
554 — DEGREE 1     0.5
556 — DEGREE 2     0.2

FIG. 9.2.2

PARTIAL DEVICE CONTROL INFORMATION FRAME RECORD — 560
562 — MOTOR 1     0.731
564 — TIME     1435273535.614

FIG. 9.2.3

Figure 9:
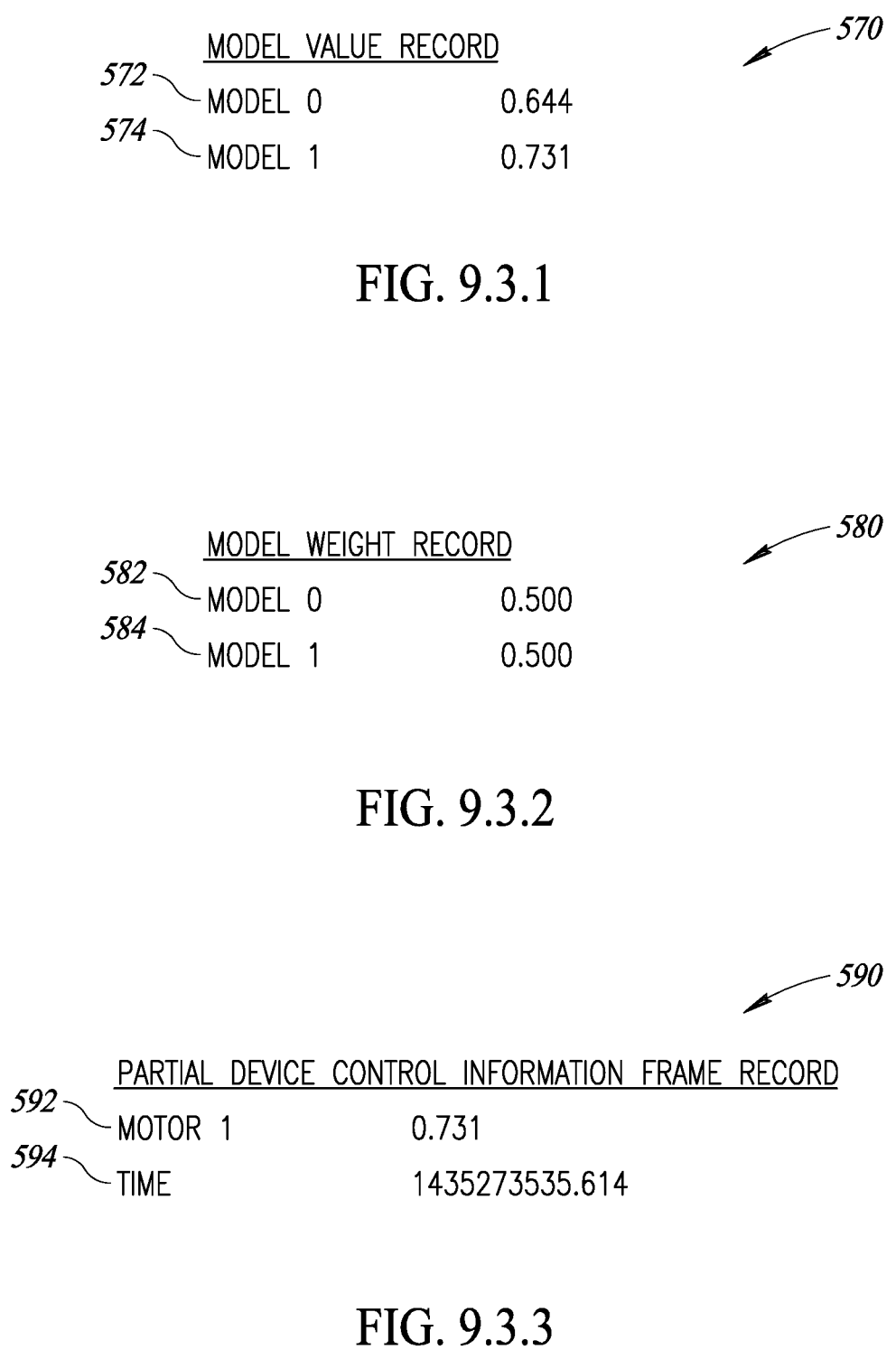

MODEL VALUE RECORD ←―570

572 ―MODEL 0        0.644
574 ―MODEL 1        0.731

FIG. 9.3.1

MODEL WEIGHT RECORD ←―580

582 ―MODEL 0        0.500
584 ―MODEL 1        0.500

PARTIAL DEVICE CONTROL INFORMATION FRAME RECORD

592 ―MOTOR 1        0.731
594 ―TIME           1435273535.614

FIG. 9.3.3

| KEY | ARRAY | | | | | |
|---|---|---|---|---|---|---|
| 602 ('POS',1) | 606 TIMES | 612 0 | 614 1 | ... | 616 12 | 13 |
| | 618 1435273535.354 | 620 1435273535.374 | ... | 622 1435273535.594 | |
| | 608 VALUES | 624 0.500 | 626 0.512 | ... | 628 0.644 | |

PARTIAL EVENT SERIES ARRAY DATA STRUCTURE

FIG. 10

```
                                                        ┌─ 630
                                                       ╱
      PARTIAL DEVICE CONTROL INFORMATION FRAME RECORD
632 ─ MOTOR 1          0.647
634 ─ TIME             1435273535.614
```

FIG. 11.1

```
                                                        ┌─ 640
                                                       ╱
      PARTIAL DEVICE CONTROL INFORMATION FRAME RECORD
642 ─ MOTOR 1          0.691
644 ─ TIME             1435273535.614
```

FIG. 11.2

```
                                                        ┌─ 650
                                                       ╱
      PARTIAL DEVICE CONTROL INFORMATION FRAME RECORD
652 ─ MOTOR 1          0.701
654 ─ TIME             1435273535.614
```

FIG. 11.3

DEVICE ENVIRONMENT FRAME RECORD

| | | |
|---|---|---|
| 702 — LEFT IMAGE | | |
| 704 — RIGHT IMAGE | | |
| 706 — LEFT AUDIO | | |
| 708 — RIGHT AUDIO | | |
| 710 — MOTOR 1 POSITION | 0.20 | |
| 712 — MOTOR 2 POSITION | 0.10 | |
| 714 — MOTOR 3 POSITION | 0.15 | |
| 716 — MOTOR 4 POSITION | 0.10 | |
| 718 — MOTOR 5 POSITION | 0.10 | |
| 720 — MOTOR 6 POSITION | 0.10 | |
| 722 — TIME | 1439226043.354 | |

FIG. 12

| OPERATOR INTERFACE SENSOR FRAME RECORD | |
|---|---|
| 802 — OPERATOR AUDIO | ∿∿ |
| 804 — IMU X-AXIS | 0.10 |
| 806 — IMU Z-AXIS | 0.10 |
| 808 — POTENTIOMETER 1 | 0.10 |
| 810 — POTENTIOMETER 2 | 0.20 |
| 812 — POTENTIOMETER 3 | 0.10 |
| 814 — GLOVE | 0 |
| 816 — TIME | 1439226043.354 |

METHOD, SYSTEM AND APPARATUS TO CONDITION ACTIONS RELATED TO AN OPERATOR CONTROLLABLE DEVICE

CROSS REFERENCE TO RELATED APPLICATIONS

This application claims the benefit of U.S. Provisional Application No. 62/235,416 entitled "METHOD, SYSTEM AND APPARATUS TO CONDITION ACTIONS RELATED TO AN OPERATOR CONTROLLABLE DEVICE", filed on Sep. 30, 2015, which is hereby incorporated by reference herein in its entirety.

BACKGROUND OF THE INVENTION

Field of Invention

This invention relates to control of devices, and more particularly to creating conditioned actions related to an operator controllable device.

Description of Related Art

Delays in communication systems can provide frustrating experiences. For example, delays may occur during phone calls or VOIP communications and such delays may be detrimental to the user experience. Delays may be particularly problematic in "robotic telepresence" where users remotely operate devices or robots.

There may be many potential sources of delay. One source of delay may be the actual communication transmission time. This may be especially relevant where a robot is being operated at a great distance, e.g., an operator in Toronto controls a robot in Vancouver. Another source of delay may be the processing of data, such as for example, video input and encryption of the information to be sent and received.

SUMMARY OF THE INVENTION

In accordance with one illustrative embodiment of the invention, there is provided a method of conditioning one or more actions related to an operator controllable device.

The method includes receiving one or more action-based instructions representing one or more operator controllable device actions associated with the operator controllable device. The method also includes receiving one or more action-oriented time representations representing one or more times associated with the one or more action-based instructions. The method also includes deriving at least one conditioned action-based instruction for a time subsequent to the one or more times represented by the received one or more action-oriented time representations from the received one or more action-based instructions and the received one or more action-oriented time representations. Said at least one conditioned action-based instruction causes the operator controllable device to take one or more conditioned actions. The method also includes producing a signal representing the at least one conditioned action-based instruction for causing the operator controllable device to take the one or more conditioned actions.

Another illustrative embodiment describes a method of conditioning one or more actions related to an operator controllable device, involving receiving one or more action-based instructions representing one or more operator controllable device actions associated with the operator controllable device, and receiving one or more action-oriented time representations representing one or more times associated with the one or more action-based instructions. The method also includes deriving at least one conditioned action-based instruction for a time subsequent to the one or more times represented by the received one or more action-oriented time representations from: the received one or more action-based instructions, and the received one or more action-oriented time representations. The at least one conditioned action-based instruction, when executed, causes the operator controllable device to take one or more conditioned actions. The method also includes producing at least one signal representing the at least one conditioned action-based instruction, which when executed, causes the operator controllable device to take the one or more conditioned action.

Another illustrative embodiment describes an apparatus including a body, and at least one processor coupled to the body. The apparatus also includes at least one non-transitory computer-readable storage media coupled to the at least one processor, and which stores processor-executable codes thereon which when executed, by at least one processor, causes the at least one processor to receive one or more action-based instructions representing one or more actions associated with the body, receive one or more action-oriented time representations representing one or more times associated with the one or more action-based instructions, and derive at least one conditioned action-based instruction for a time subsequent to the one or more times represented by the one or more action-oriented time representations from the one or more action-based instructions, and the one or more action-oriented time representations. The at least one conditioned action-based instruction, when executed, causes the body to take one or more conditioned actions.

Another illustrative embodiment describes a non-transitory computer readable storage medium having stored thereon processor readable codes which, when executed by at least one processor, cause the at least one processor to receive one or more action-based instructions representing one or more operator controllable device actions associated with an operator controllable device, and receive one or more action-oriented time representations representing one or more times associated with the one or more action-based instructions. The processor readable codes, when executed by at least one processor, also cause the at least one processor to derive at least one conditioned action-based instruction for a time subsequent to the one or more times represented by the one or more action-oriented time representations from the one or more action-based instructions, and the one or more action-oriented time representations. The at least one conditioned action-based instruction when executed, causes the operator controllable device to take one or more conditioned actions. The processor readable codes, when executed by at least one processor, also cause the at least one processor to producing at least one signal representing the at least one conditioned action-based instruction for causing the operator controllable device to take the one or more conditioned actions.

Another illustrative embodiment describes a system including an operator controllable device, and at least one processor communicatively coupled to the operator controllable device. The system also includes at least one non-transitory computer-readable storage media coupled to the at least one processor, and which stores processor-executable codes thereon which when executed, by at least one processor, causes the at least one processor to receive one or more action-based instructions representing one or more actions of the operator controllable device, and receive one or more action-oriented time representations representing one or more times associated with the one or more action-based instructions. The processor-executable codes when executed, by at least one processor, also causes the at least one processor to derive at least one conditioned action-based instruction for a time subsequent to the one or more times represented by the one or more action-oriented time representations from the one or more action-based instructions, and the one or more action-oriented time representations, and produce at least one signal representing the at least one conditioned action-based instruction, which when executed, cause the operator controllable device to take the one or more conditioned actions.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Aspects of the present document can be better understood by referring to the following drawings. The components in the drawing are not necessarily drawn to scale. As well, like reference numbers indicate corresponding parts. In drawings which illustrate various embodiments of the invention.

FIGS. 7.1-7.3 are flowcharts depicting blocks of code to direct the operator controllable device shown in FIG. 2 to condition action-based instructions to be prediction action-based instructions;

FIGS. 7.4-7.6 are flowcharts depicting blocks of code to direct the operator controllable device shown in FIG. 2 to condition action-based instructions to filtered action-based instructions;

FIG. 9.1.1 is a representation of an exemplary partial device control information frame record for use in the system shown in FIG. 1 when implementing static predictions;

FIGS. 9.2.1-2 are representations of supporting data structures for use in the system shown in FIG. 1 when implementing polynomial predictions;

FIG. 9.2.3 is a representation of an exemplary partial device control information frame record for use in the system shown in FIG. 1 when implementing polynomial predictions;

FIGS. 9.3.1-2 are representations of supporting data structures for use in the system shown in FIG. 1 when combining multiple prediction approaches;

FIG. 9.3.3 is a representation of an exemplary partial device control information frame record for use in the system shown in FIG. 1 when combining multiple prediction approaches;

FIG. 10 is a representation of an exemplary partial event series array data structure containing event sensor information for use in the system shown in FIG. 1 when creating condition action-based instructions;

FIG. 11.1 is a representation of an exemplary partial device control information frame record for use in the system shown in FIG. 1 to create conditioned action-based instructions by imposing a maximum rate-of-change;

FIG. 11.2 is a representation of an exemplary partial device control information frame record for use in the system shown in FIG. 1 to create conditioned action-based instructions by applying a linear filter;

FIG. 11.3 is a representation of an exemplary partial device control information frame record for use in the system shown in FIG. 1 to create conditioned action-based instructions by applying a Kalman filter;

FIG. 12 is a representation of an exemplary device environment frame record for use in the system shown in FIG. 1;

DETAILED DESCRIPTION

Figure 1:
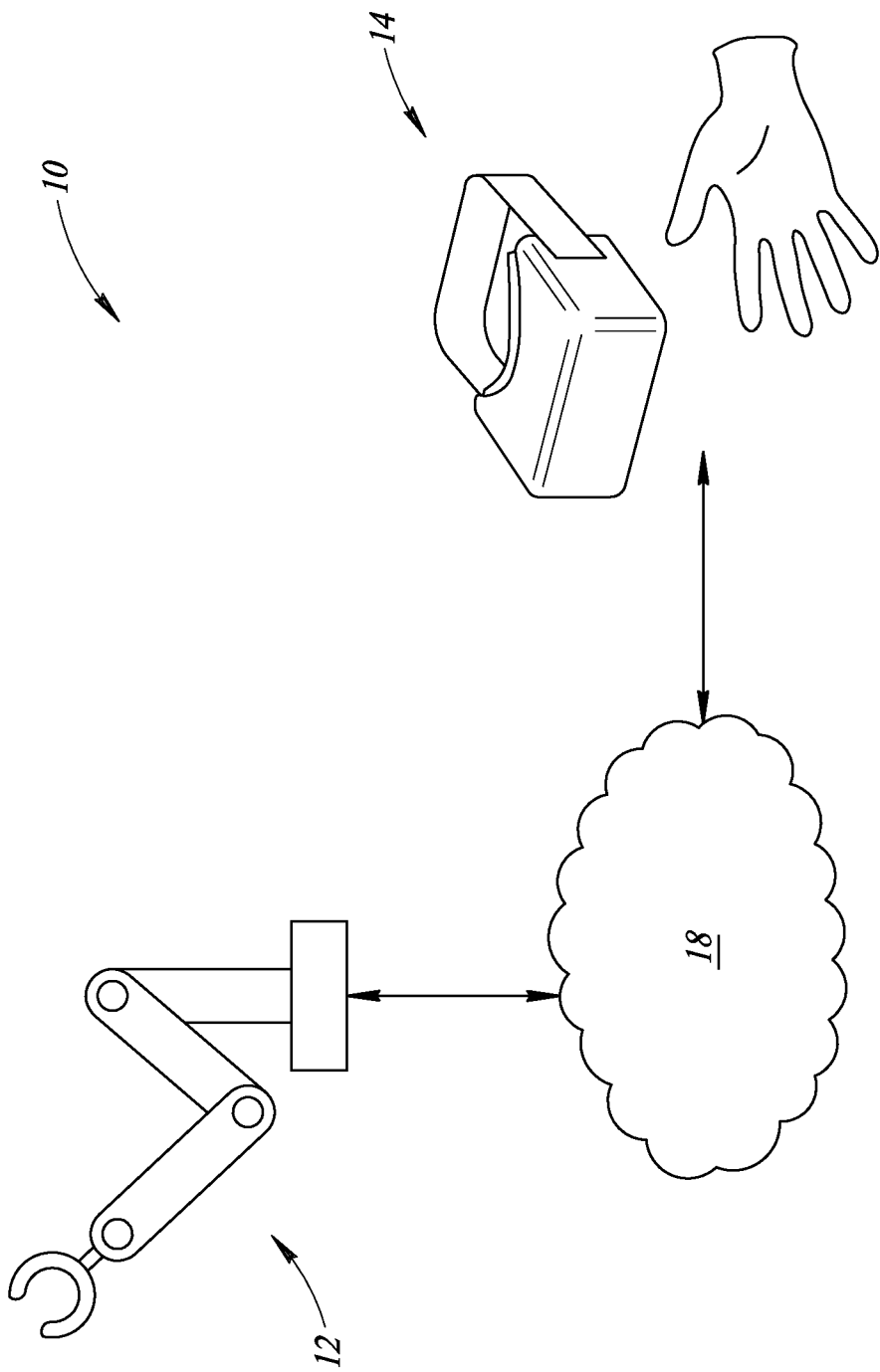
FIG. 1 is a schematic view of a system to condition actions related to an operator controllable device in accordance with various embodiments of the invention.

Examples of systems, devices, articles, and methods related to creating one or more conditioned actions associated with an operator controllable device are described herein. Examples of conditioned actions are filtered actions and predicted actions. In the following description, numerous specific details are set forth to provide a thorough understanding of embodiments of the invention. One skilled in the relevant art will recognize, however, that the teachings of this disclosure can be practiced without one or more of the specific details, or with other methods, components, materials, and the like. In other instances, well-known structures, materials, or operations are not shown or described in detail to avoid obscuring aspects of the invention. For example, sensors and servos on an operator controllable device may be omitted.

Reference throughout this specification to "an embodiment", "one embodiment", "this embodiment", and similar phrases including those based on "implementation" and "example", means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

General Overview

Delays in the control of an operator controllable device may be large enough that they have a negative impact on operator experience and/or performance of the operator controllable device. In some cases, a sufficient delay could even prevent an operator and an operator controllable device from performing complex tasks. This effect may be exacerbated if an operator controllable device (e.g., a robot) were to be designed to act analogous to a human because users may be used to there being no delay in acting with their own bodies. For example, users may find being a pilot particularly frustrating or difficult to control the robot if the user is unable to move the robot's arms like they would move their own. Providing an improved user experience may involve reducing these delays or at least the user's perception of them.

Examples of systems, devices, articles, and methods related to creating one or more conditioned actions associated with an operator controllable device are described herein. Conditioned actions may be used to reduce latency in the operation an operator controllable device even when a communication latency exists in a channel between an operator interface and the operator controllable device. Conditioned actions may be used to otherwise improve the performance of an operator controllable device. For example a filtered action may improve the operation of an operator controllable device. A filtered action will appear smoother in operation. Other aspects of the present disclosure are described herein.

An operator controllable device is an electro-mechanical machine controlled by a human operator and/or circuitry and/or a processor executing program codes; a subsystem (or apparatus) of another machine including an operator controllable device; or the like.

System, Operator Controllable Device, and Operator Interface

Referring to FIG. 1, according to one embodiment of the invention, there is provided a system 10 to condition actions related to an operator controllable device. In the embodiment shown, the system 10 includes an operator controllable device 12 and an operator interface 14. The operator controllable device 12 and the operator interface 14 may be in communication with one another. In various embodiments, the operator controllable device 12 and the operator interface 14 may be in communication with one another through a communications channel or network 18, which may be a wired or wireless network or combination of subnetworks.

In FIG. 1, the operator controllable device 12 and the operator interface 14 are shown as symbols including features. The symbols and/or features are shown for exemplary purposes only. In various embodiments, the operator controllable device 12 and the operator interface 14 may include fewer, additional or alternative features compared to those shown in FIG. 1, for example, as described below. For example, the operator controllable device 12 could include a propulsion subsystem (e.g., wheels and drive train) and/or manipulation subsystem (e.g., include an appendage, end-effector, manipulator). For example, the operator controllable device 12 and the operator interface may include one or more aspects of an operator controllable device and an operator interface as described in U.S. Provisional Patent Application No. 62/158,467.

In various embodiments, an operator may use the operator interface 14 to control the operator controllable device 12. Operator interface 14 includes sensors to provide operator interface sensor information. In various embodiments, the operator interface 14 may be directed to derive action-based instructions from operator interface sensor information. The operator interface 14 may be directed to send the action-based instructions to the operator controllable device 12. The operator interface 14 may also be directed to send action-oriented time representations associated with the action-based instructions to the operator controllable device 12. An example of a sensor information is a voltage. An example of an action based instruction is a movement instruction.

A operator controllable device, like operator controllable device 12, is an electro-mechanical machine controlled by a human operator and/or circuitry and/or one or more processors executing program codes. Operator controllable device 12 can be controlled autonomously, for example via an on-board or a remote processor executing processor executable program codes, typically based on some sensed input data (e.g., processed machine-vision information, information that represents a level of force or weight sensed by a transducer, information representative of a distance traveled, for instance optical encoder information information). One or more human operators can control one or more operator controllable devices like operator controllable device 12. Another machine, including another operator controllable device, or the like, can control operator controllable device 12. In some instances, operator controllable device 12 may be controlled autonomously at one time, while being piloted, operated, or controlled by a human operator at another time. That is, operate under an autonomous control mode and change to operate under a piloted mode (i.e., non-autonomous).

Deriving Conditioned Action-Based Instructions

The operator controllable device 12 may receive action-based instructions from the operator interface 14. The operator controllable device 12 may receive action-oriented time representations associated with the action-based instructions. The operator controllable device may then derive conditioned action-based instructions for a time subsequent to one or more times represented by the received one or more action-oriented time representations. Conditioned actioned-based instructions may be derived through one or more operations to condition action-based instructions which may include the creation of one or more predicted action-based instructions and/or one or more filtered action-based instructions.

The operator controllable device 12 may derive conditioned action-based instructions using one or more predictions. In some embodiments, the prediction assumes no change subsequent to the one or more received action-oriented time representations. In some embodiments, the prediction is created from a time based function. That is, a function who argument is a measure of time. In some embodiments, predictions use polynomial estimation. The time based function is a polynomial with time as the variable. In some embodiments, the operator controllable device 12 may combine more than one predictions in generating, creating, or deriving conditioned action-based instructions.

The operator controllable device 12 may derive conditioned action-based instructions by applying operations to filter the action-based instructions and create filtered action-based instructions. In some embodiments, for example, operations to filter include use of one or more rate-of-change limits, linear filters, and/or Kalman filters.

In some embodiments, the operator controllable device 12 may combine one or more prediction, and/or one or more operations to filter in deriving conditioned action-based instructions.

In some embodiments, the action-based instructions may cause the operator controllable device 12 to simulate or replicate at least one action taken by the operator.

Thus, in various embodiments, the system 10 facilitates creation of one or more conditioned action-based instructions related to an operator controllable device.

Operator Controllable Device and Operator Interface

Operator Controllable Device—Processor Circuit

Figure 2:
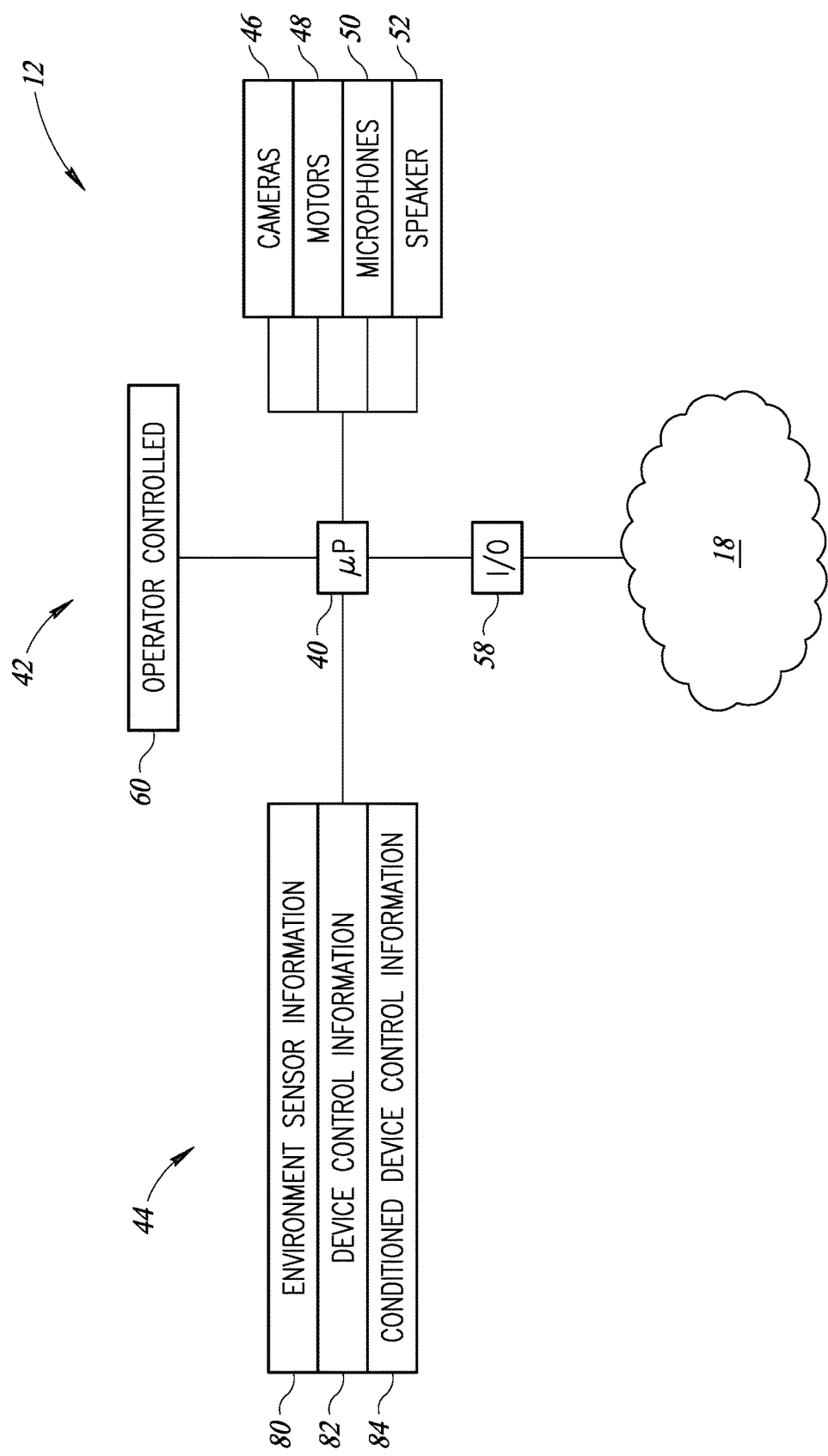
FIG. 2 is a schematic view of a processor circuit to implement an operator controllable device shown in FIG. 1.

Referring to FIG. 2, a schematic view of a processor circuit for implementing the operator controllable device 12 shown in FIG. 1 according to one embodiment is shown. In some embodiments, the operator controllable device 12 includes a device processor 40, a program memory 42, a variable memory 44, cameras or other imagers 46, motors or actuators 48, microphones 50, a speaker 52 and an input/output ("I/O") interface 58, all of which are in communication with the device processor 40. The I/O interface 58 may include a network interface comprising a network interface card with an input/output that may connect to the network 18, and through which communications may be conducted with devices connected to the network 18, such as the operator interface 14 shown in FIG. 1.

FIG. 2 illustrates various examples of processor readable and processor executable instructions, or program codes, which when executed direct the device processor 40 to carry out various functions. The processor readable instructions, or program codes, or code, when executed may direct the device processor 40 to cause (i.e., effect) action by the operator controllable device 12. The program codes, when executed may direct the device processor 40 to condition action-based instructions for the operator controllable device 12. The processor readable and processor executable instructions, or program codes, or code, may be stored in the program memory 42, which may be implemented as a read only memory (ROM), random access memory (RAM), a hard disk drive (HDD), a network drive, flash memory, any other form of nontransitory tangible computer-readable memory or storage medium, and/or a combination thereof.

In various embodiments, the program memory 42 includes a block of program codes 60 for directing the operator controllable device 12 to effect operator controlled functions and derived conditioned actions.

This specification may state that certain encoded entities such as applications perform certain functions. Whenever an application or encoded entity is described as taking an action, as part of, for example, a function or a method, it will be understood that a processor (e.g., the device processor 40) is directed to take the action by way of programmable codes or processor readable instructions defining or forming part of the application and/or cause another component, for example a part of system 10, to take the action.

In some embodiments, the variable memory 44 includes a plurality of storage locations including location 80 which stores environment sensor information, location 82 which stores device control information, and location 84 which store conditioned device control information. In various embodiments, environment sensor information, device control information, and conditioned device control information, stored in locations 80, 82, and 84, include processor readable information.

In various embodiments, the variable memory 44 may be implemented as RAM, a hard drive, a network drive, flash memory, a memory stick or card, any other form of tangible nontransitory computer-readable storage medium or a combination thereof.

In some embodiments, program memory 42 and variable memory 44 are part of the same memory device.

In various embodiments, the operator controllable device 12 may be controllable by a human operator via the operator interface 14 (for example, as shown in FIG. 1). In some embodiments, the sensors and actuators and/or output devices of the operator controllable device 12 (e.g., the cameras 46, motors 48, microphones 50, and speaker 52) are positioned and oriented to sense and react to an environment of the operator controllable device 12 in an analogous way to a human being.

Operator Interface—Processor Circuit

Figure 3:
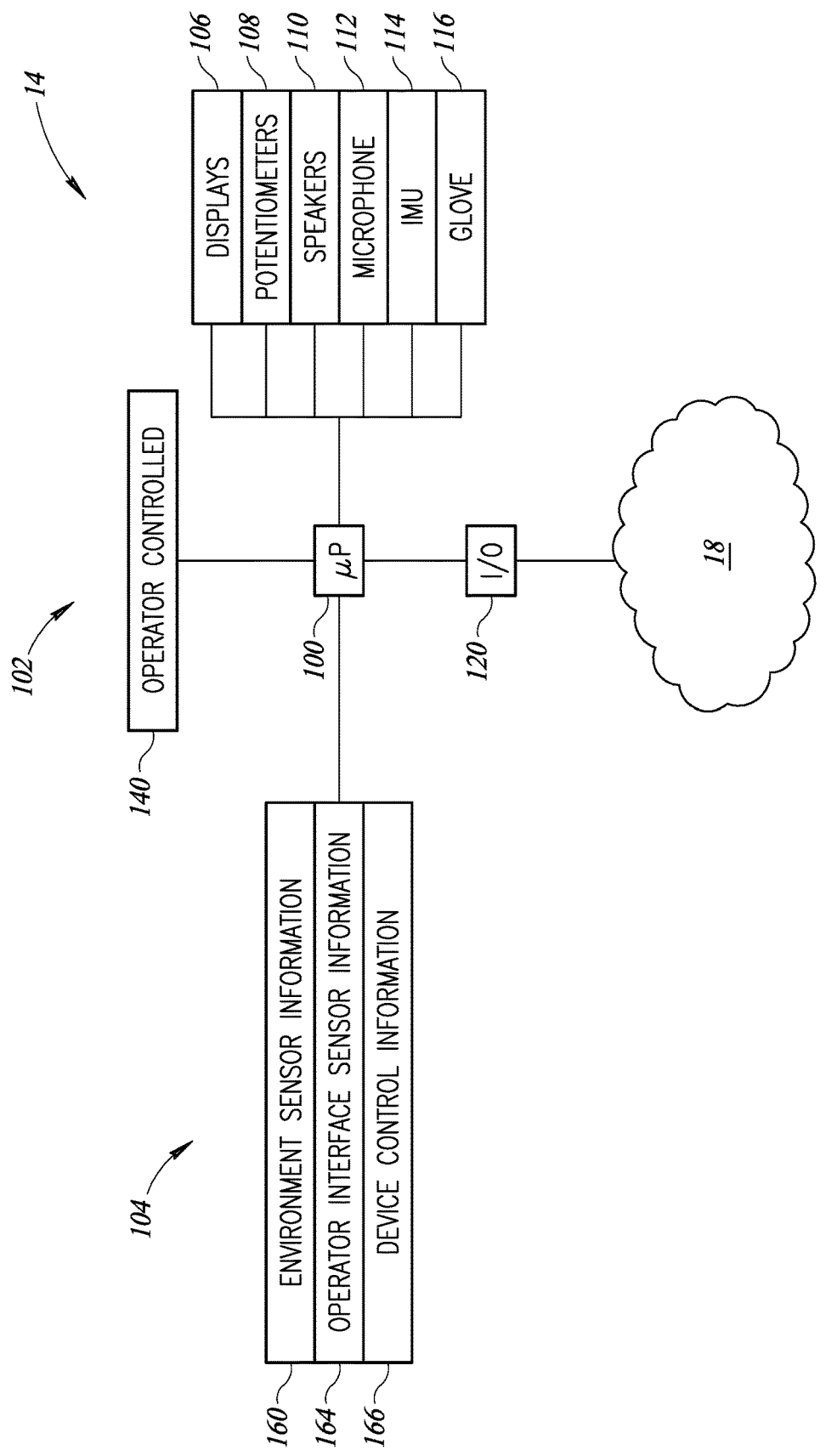
FIG. 3 is a schematic view of a processor circuit to implement an operator interface shown in FIG. 1.

FIG. 3 shows a schematic view of a processor circuit for implementing the operator interface 14 shown in FIG. 1 in accordance with at least one embodiment. The operator interface 14 includes an operator interface processor 100, a program memory 102, a variable memory 104, displays 106, potentiometers 108, speakers 110, a microphone 112, an inertial measurement unit ("IMU") 114, a haptic glove or manipulator interface 116, and an input/output ("I/O") interface 120, all of which are in communication with the operator interface processor 100. The haptic glove 116 is an input device that senses a body's movements by physical contact with the operator.

In various embodiments, an operator interface generally similar to the operator interface 14 shown in FIG. 3 may include additional or alternative motors, sensors, and/or output devices. In some embodiments, for example, the operator interface includes one or more input mechanisms such as, a motion capture system, or a computer interface input for a web version of the interface involving a keyboard, mouse, joystick, or gaming style inputs that may, in various embodiments, utilize game controllers.

In various embodiments, the program memory 102, variable memory 104, and I/O interface 120 may be implemented, for example, as described for the program memory 42, variable memory 44, and I/O interface 58 of the operator controllable device 12 shown in FIG. 2.

In various embodiments, the program memory 102 includes a block of program codes 140 which when executed cause the operator interface 14 to effect device control.

The variable memory 104 includes a plurality of storage locations including location 160 that may store device environment sensor information, location 164 that may store operator interface sensor information, and location 166 that may store device control information. In various embodiments, device environment sensor information, operator interface sensor information, and device control information, stored in locations 160, 164, and 162, includes processor readable information.

In various embodiments, a human operator selectively interacts with the operator interface 14. In some embodiments, the sensors and actuator and/or output devices of the operator interface 14 (e.g., the displays 106, potentiometers 108, speakers 110, microphone 112, IMU 114, and haptic glove 116) are interacted with by an operator such that the operator is able to experience and react to a representation or simulation of an environment sensed by the operator controllable device 12 shown in FIG. 2.

Deriving Conditioned Action-Based Instructions

In various embodiments, the operator controllable device 12 shown in FIG. 1 is controlled by an operator using the operator interface 14 to facilitate device control.

Figure 4:
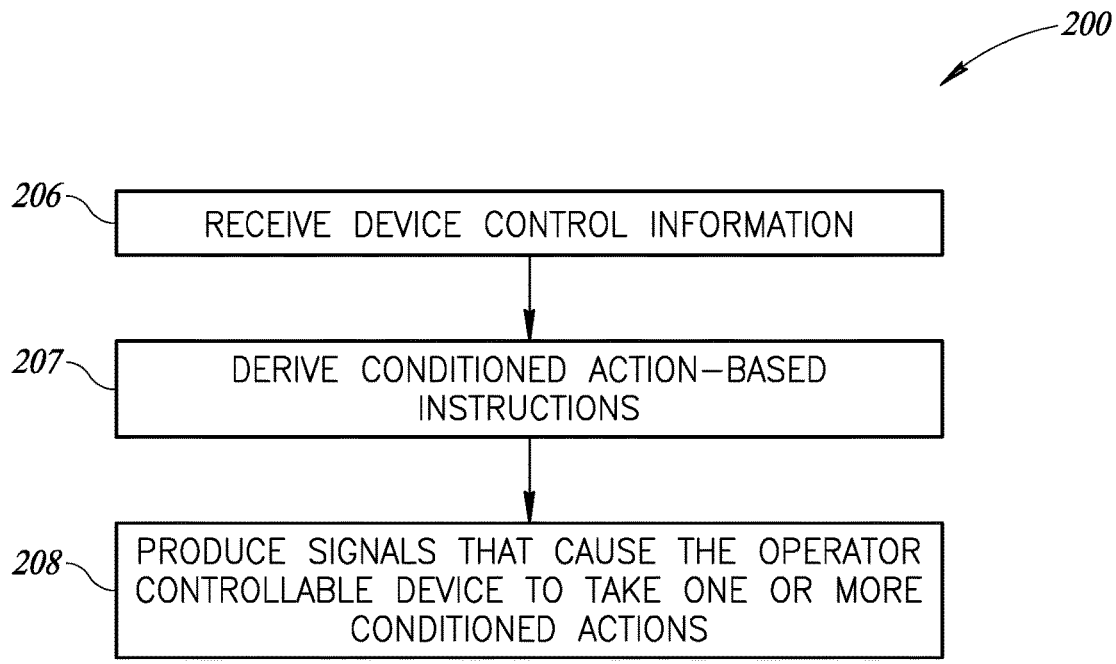
FIG. 4 is a flowchart depicting blocks of code to direct the operator controllable device shown in FIG. 2 to condition action based instructions.

Referring to FIG. 4, a flowchart 200 is generally shown depicting blocks of code for directing the operator controllable device shown in FIG. 2 to condition action-based instructions. The flowchart 200 may be encoded in the block of program codes 60 shown in FIG. 2 which when executed by the device processor 40 cause the device processor 40 to condition action-based instructions. In various embodiments, deriving conditioned action-based instructions may comprise aspects of creating a prediction and/or applying operations to filter. Predictions may, by way of example only, involve assuming no change in action-based instructions subsequent to one or more received action-oriented time representations; using polynomial estimation; and/or combining more than one prediction. In some embodiments, predictions are derived from a time based function. Operations to filter may involve applying one or more filters. For example, operations to filter an action-based instructions may, by way of example only, involve applying one or more rate-of-change limits; linear filters; and/or Kalman filters. In some embodiments, creating condition action-based instructions may comprise using one or more prediction and/or one or more operations to filter. A filtered action-based instruction, when executed, would appear in operation to be smoother.

Receiving Action-Based Instructions and Action-Oriented Time Representations

Device Control Information

Referring to FIG. 4, the flowchart 200 begins with block 206, which directs the device processor 40 shown in FIG. 2 to receive device control information. In various embodiments, the device control information includes action-based instructions and associated action-oriented time representations. In various embodiments, block 206 may direct the device processor 40 to receive a representation of device control information via the I/O interface 58 and the network 18. The representation of the device control information may have been sent by the operator interface 14, for example.

Figure 5:
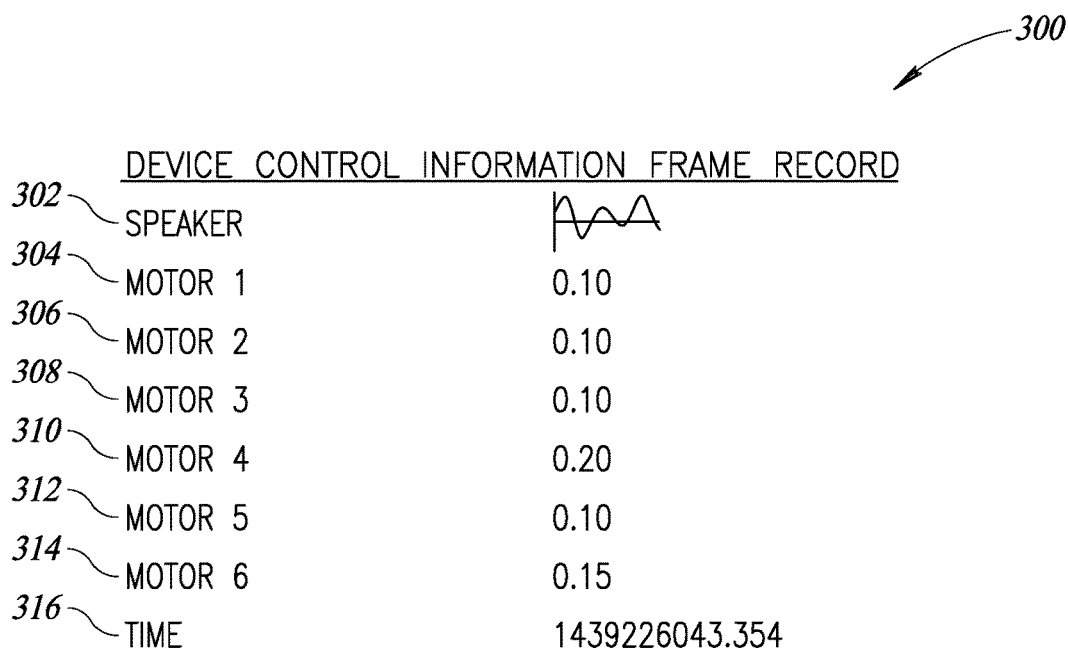
FIG. 5 is a representation of an exemplary device control information frame record used in the system shown in FIG. 1.

In various embodiments, the device control information may be represented in a record such as the exemplary device control information frame record 300 shown in FIG. 5. Device control information frame records contain action-based instructions which when executed control one or more of the actuators and/or output devices found on the operator controllable device 12. Examples include the motors 48 of FIG. 2 and/or the speaker 52. The exemplary record 300 found in FIG. 5 includes field 302, a location included in a data structure, representing an action-based instruction for the speaker 52, fields 304-314 representing action-based instructions for motors 1-6 which are included in the motors 48 of FIG. 2, and field 316 representing an action-oriented time representation associated with the action-based instructions included in the device control information frame record 300. In some embodiments, action-oriented time representations found in field 316 is associated with the time at which the action-based instructions were generated or derived by the operator interface 14. In some embodiments, the action-oriented time representations found in field 316 is associated with the time at which operator interface sensor information was received by the operator interface 14.

The device control information frame record shown in FIG. 5 is shown for exemplary purposes only and embodiments of the invention may use device control information frame records that include additional, fewer, or different fields. In some embodiments, the operator interface 14 sends the action-oriented time representations separately from the associated action-based instructions. In some embodiments, action-oriented time representations received by the operator controllable device 12 are not have been sent by the operator interface 14. For example, in some embodiments, action-oriented time representations are associated with the time one or more action-based instructions were received by the operator controllable device 12. In some embodiments, the operator controllable device 12 generates action-oriented time representations. For example, the operator controllable device 12 generates action-oriented time representations using functions familiar to those skilled in the art such as, for example, a function included in an operating system of the operator controllable device, such as, for example, the time.time( ) function in Python. In such embodiments, the operator controllable device 12 may be considered to receive the action-oriented time representations from the operator controllable device 12.

Event Series Array Data Structure

In various embodiments, block 206 shown in FIG. 4 may direct the device processor 40 shown in FIG. 2 to store device control information, comprising one or more representations of action-based instructions associated with one or more action-oriented time representations, in location 82 of the variable memory 44. In such embodiments, block 206 may direct the device processor 40 to store device control information such that it is ordered by the one or more action-oriented time representations in an ascending manner.

Figure 6:
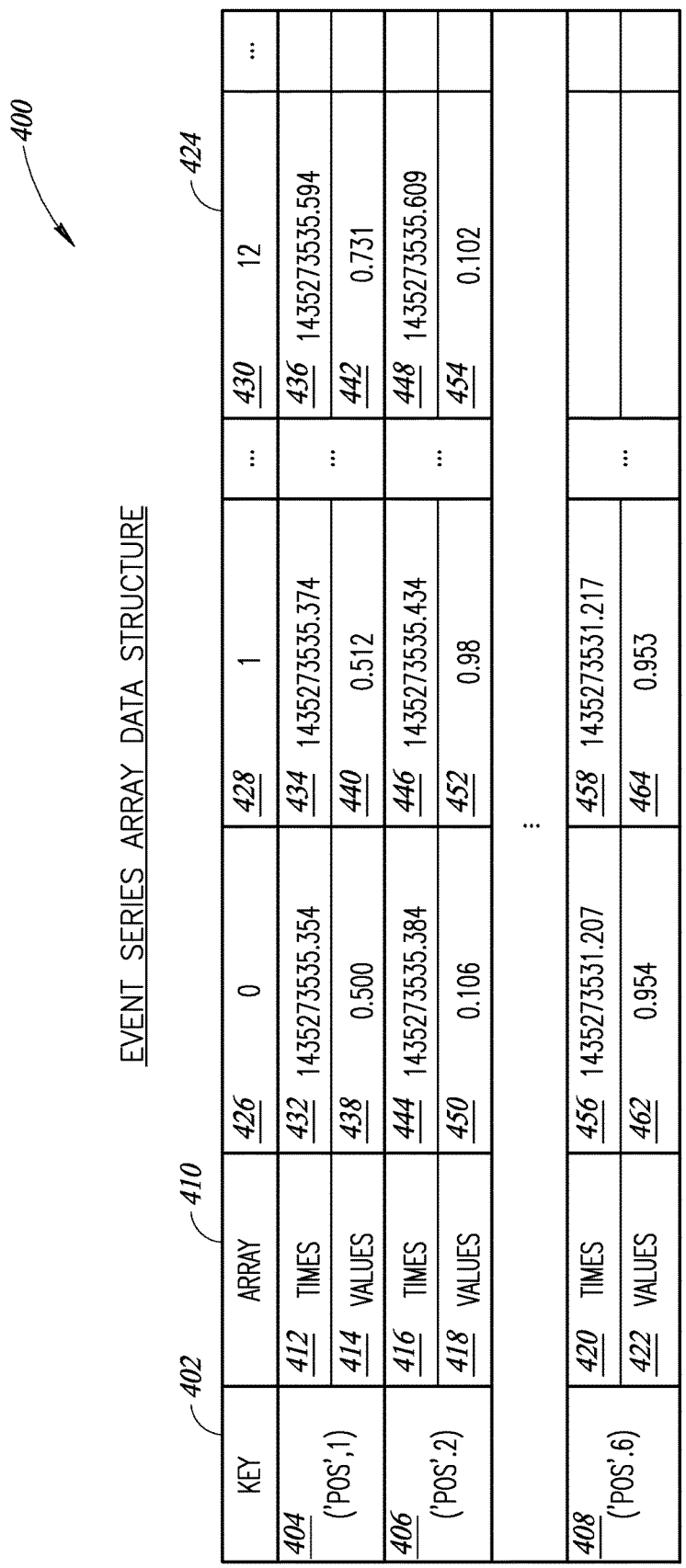
FIG. 6 is a representation of an exemplary event series array data structure used in the system shown in FIG. 1.

In various embodiments, the device control information is stored in an ordered data type such as the exemplary event series array 400, a data structure, shown in FIG. 6. In such embodiments, one or more types of action-based instructions associated with one or more motors and/or output devices may be stored in the event series array 400. By way of example only, motor position information and associated time information may be stored in the event series array 400. In various embodiments, additional or different device control information or other types of information may be stored in an event series array data structure.

In various embodiments, block 206 may direct the device processor 40 to store device control information in location 82 of the variable memory 44 organized by one or more keys shown in column 402 of the exemplary event series array 400 of FIG. 6. The exemplary keys include keys 404, 406, and 408, which represent information, such as the types of action-based instructions and associated devices, associated with respective sets of device control information. For example, the key 404 ('pos', 1) may be used to refer to motor position information and associated time information for motor 1. In the exemplary event series array 400 shown in FIG. 6, the keys 404, 406, and 408 may therefore be used to access motor position information and associated time information for motors 1, 2, and 6, respectively. In various embodiments, additional or different types of information is associated with device control information and used as keys.

In various embodiments, block 206 may direct the device processor 40 to store device control information in location 82 of the variable memory 44 such that it is organized based on types of the device control information. In various embodiments, block 206 directs the device processor 40 to store one or more arrays for one or more types of device control information in association with one or more keys. In the exemplary event series array 400 shown in FIG. 6, arrays 414, 418, and 422 are associated with the keys 404, 406, and 408 respectively and may contain action-based instruction representations associated with motors 1, 2, and 6, respectively, whereas arrays 412, 416, and 420 are associated with the keys 404, 406, and 408 respectively and may contain action-oriented time representations associated with the action-based instruction representations found in arrays 414, 418, and 422.

In various embodiments, block 206 directs the device processor 40 to store device control information in location 82 of the variable memory 44 such that it is accessible by increasing indices associated with non-decreasing action-oriented time representations. In such embodiments, the device processor 40 may store device control information such that increasing indices are associated with action-oriented time representations equivalent or subsequent to action-oriented time representations associated with earlier indices.

In the exemplary event series array 400 shown in FIG. 6, indices are shown in row 424 and may be used to access device control information stored in one or more arrays in column 410 for one or more keys e.g., keys 404, 406, and 408 in column 402. In the exemplary event series array 400, each of the indices in the row 424 may be common to all arrays for each key. Therefore index field 426 (0) may be used to access associated values 432 and 438 in the time array 412 and the value array 414, respectively, for motor 1. Likewise, the index field 426 (0) may be used to access associated values in fields 444 and 450 in the time array 416 and the value array 418, respectively, for motor 2. The index field 426 (0) may be used to access associated values 456 and 462 in the time array 420 and the value array 422, respectively, for motor 6. However, as is illustrated in FIG. 6, information referenced by an index for one key may not be associated with information referenced by the same index for another key. Therefore, index field 426 (0) may refer to different action-oriented time representations for different keys. For example, the action-oriented time representation found in field 458, referenced by index field 428 may occur earlier than the action-oriented time representations found in fields 444, 446, and 448, referenced by index fields 426, 428, and 430, respectively. Index 428 is associated with values 434 and 440, 446 and 452, and 458 and 464 in arrays 412-422. Index field 430 is associated with values 436 and 441, and 448 and 454.

In various embodiments, action-oriented time representations associated with newly received device control information may not arrive in non-decreasing order. This may occur for a plurality of reasons such as, for instance, if some device control information takes longer to transmit than other device control information. In various embodiments, block 206 may therefore direct the device processor 40 to determine where in the variable memory 44 newly received device control information may be stored to maintain the order of the device control information in location 82 of the variable memory 44. In such embodiments, block 206 may then direct the device processor 40 to move device control information associated with later action-oriented time representations to higher indices. For example, in some embodiments, block 206 may direct the device processor 40 to use operations such as "memcpy". Block 206 may then direct the device processor 40 to insert new device control information into the identified location by copying values. The arrays may be of unequal length.

In various implementations, the storage of device control information in an ordered format may allow it to be accessed more rapidly which may facilitate the generation of predicted device control information. In various embodiments, block 206 may direct the device processor 40 to store device control information in location 82 of the variable memory 44 in a manner that is not ordered. In such embodiments, subsequent blocks of code may be required to sort device control information retrieved from location 82 of the variable memory 44 by action-oriented time representations associated therewith. For example, if conditioning operations included in block 207 requires device control information to be ordered by associated time representations, those blocks may first cause the device processor 40 to perform sort operations. Those skilled in the art will be familiar with sort operations and approaches that may be implemented in various embodiments.

Creating Conditioned Action-Based Instructions

In various embodiments, block 207 may then direct the device processor 40 to condition action-based instructions using one or more operations. In various embodiments, one or more of these operations may create one or more predictions.

In some embodiments, block 207 may include blocks of code such as those illustrated in flowcharts 207A found in FIG. 7.1, 207B found in FIG. 7.2, and/or 207C found in FIG. 7.3. In various embodiments, one or more of these operations may filter actions. In some embodiments, block 207 may include blocks of code such as one or more of those illustrated in flowcharts 207D found in FIG. 7.4, 207E found in FIGS. 7.5, and 207F found in FIG. 7.6. In various embodiments, one or more prediction and/or operations to filter may be executed to condition action-based instructions and they may be effected in a variety of combinations. For example, in one illustrative embodiment, block 207 may direct the device processor 40 to execute blocks of program code depicted in flowchart 207B (prediction involving polynomial estimation), flowchart 207E (filter action-based instructions involving linear filter(s)), and flowchart 207D (filter action-based instructions involving rate-of-change limit(s)). In other embodiments, other combinations may be used.

Although this specification may refer to the blocks of program code depicted in flowcharts 207A, 207B, 207C, 207D, 207E, and 207F as being applied to one motor or output device and associated action-based instructions, the blocks of code depicted in these flowcharts may be applied to one or more output devices. By way of example only, the creation of a prediction depicted by flowcharts 207A, 207B, and 207C may be used to generate predicted values for each actuator and motor and/or output device, or some subset thereof, and the application of an operation to filter depicted by flowcharts 207D, 207E, and 207F may be used to generate filtered values for each actuator and motor and/or output device, or some subset thereof.

Predictions

In various embodiments, blocks of code depicted in one or more of flowcharts 207A, 207B, and 207C direct the device processor 40 to generate predicted action-based instructions that the operator controllable device 12 may receive at some point in the future. In such embodiments, predicted action-based instructions may be generated in an effort to cause the action-based instructions to correspond to operator environment sensor information captured by the operator interface 14 at a time subsequent to the one or more times represented by the received one or more action-oriented time representations.

In various embodiments, blocks of code depicted in one or more of flowcharts 207A, 207B, and 207C may direct the device processor 40 to generate predictions using device control information stored in the variable memory 44. In some embodiments, device control information stored in location 82 of the variable memory 44 may be ordered by action-oriented time representations. In embodiments where device control information stored in location 82 of the variable memory 44 has not been ordered by action-oriented time representations, one or more sort operations may be required to facilitate prediction.

In various embodiments, blocks of code depicted in one or more of flowcharts 207A, 207B, and 207C may direct the device processor 40 to generate predicted action-based instructions that will be received in the future using device control information stored in location 82 of the variable memory 44 that satisfy various conditions. In some embodiments the device control information used for prediction may be selected based on a maximum number of action-based instructions and associated action-oriented time representations and/or a maximum age associated therewith. In one embodiment the maximum number of action-based instructions and associated action-oriented time representations is 15, and the maximum age associated therewith is 300 milliseconds, for example. In various embodiments, the maximum number of action-based instructions and associated action-oriented time representations may range from one to one million, and the maximum age associated therewith may range from one millisecond to ten seconds. Those skilled in the art may have to select values based on a number of embodiment and environment-specific conditions including, for example, network latency.

In some embodiments and environments, a maximum number of action-based instructions and associated action-oriented time representations ranges from one to one hundred and a maximum age ranges from five milliseconds to one second. In yet other embodiments and environments, all previously stored action-based instructions and associated action-oriented time representations may be selected.

In some embodiments, the criteria to select device control information for use in prediction may be constrained by a minimum number of action-based instructions and associated action-oriented time representations such that, by way of example only, the prediction must consider the values associated with at least one action-oriented time representation even if the only available values exceed other limits such as the maximum number of data points and/or the maximum age associated therewith.

Static Prediction

In various embodiments, blocks of code depicted in flowchart 207A may direct the device processor 40 to generate predicted action-based instructions assuming no change since the action-based instructions associated with the latest action-oriented time representations for a motor or output device found in location 82 of the variable memory 44.

In various embodiments, block 210 may therefore direct the device processor 40 to copy one or more action-based instructions associated with the most recently received action-oriented time representations for a motor or output device from location 82 of the variable memory 44 to location 84 of the variable memory 44. In some embodiments implementing the exemplary event series array 400 found in FIG. 6, a predicted action-based instruction for a motor or output device may be equivalent to the action-based instruction stored in the last index having a value in the associated values array for a given motor or output device.

In various embodiments, a record such as the exemplary device control information frame record 300 shown in FIG. 5 is included in the representation of the conditioned device control information stored in the location 84 of the variable memory 44 shown in FIG. 2. Therefore, block 210 may direct the device processor 40 to copy an action-based instruction from the last index having a value associated with a motor or output device to an associated field in a device control information frame record.

Figure 8:
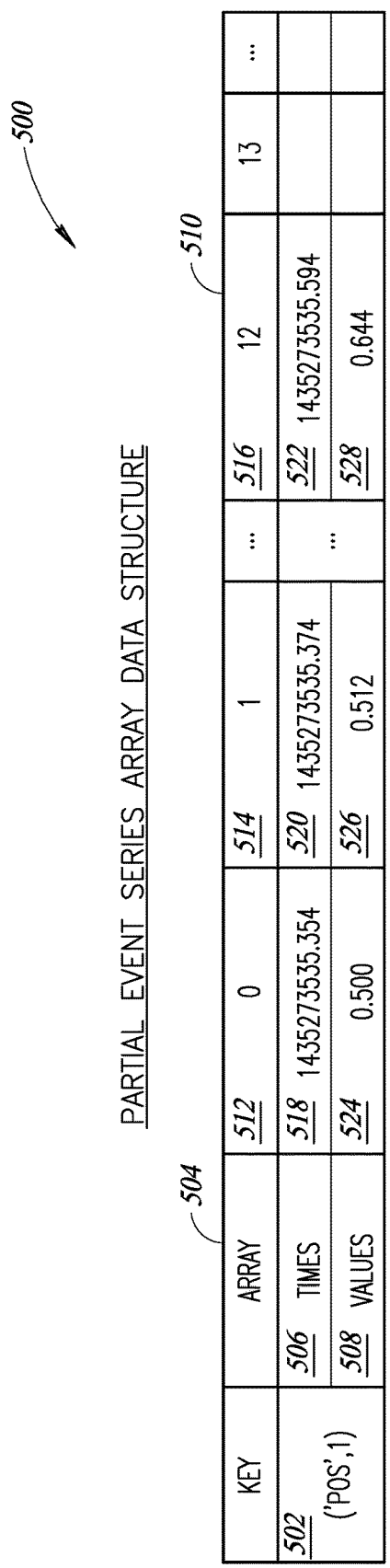
FIG. 8 is a representation of an exemplary partial event series array data structure containing device control information for use in the system shown in FIG. 1 to condition action-based instructions.

By way of example only, an exemplary partial event series array 500, a data structure, including device control information for one motor is shown in FIG. 8. Additionally, for the purposes of illustrating the function of flowchart 207A, an exemplary partial conditioned device control information frame record 530 for the same motor is shown in FIG. 9.1.1. In various embodiments, the exemplary partial event series array 500 is stored in location 82 of the variable memory 44 whereas the exemplary partial conditioned device control information frame record 530 may be stored in location 84 of the variable memory 44.

Referring to FIG. 8, the last index having a value in the exemplary partial event series array 500 may be referenced by field 516 (index 12 into array 500) because the associated times array 506 and values array 508 do not contain values associated with an index referenced by field 518 (index 13). Therefore, block 210 may direct the device processor 40 to copy motor position information from values field 528 for motor 1 in the exemplary partial event series array 500 to field 532 for motor 1 in the exemplary partial conditioned device control information frame record 530. In various embodiments, this process may be repeated for one or more of the motors or output devices. The exemplary partial event series array 500 includes key 502, arrays 504, such as array 506 and array 508, indices 512, 514, 516, and so on, row 510 to record the indices, and time values such as time 528.

In various embodiments, block 210 may direct the device processor to insert a representation of a time into records found in location 84 of the variable memory 44, including field 534 of the exemplary partial device control information frame record 530 in FIG. 9.1.1. In various embodiments, blocks of code to create action-based instructions, including those described in relation to flowcharts 207B, 207C, 207D, 207E, and 207F, may similarly direct the device processor to insert a representation of a time into device control information frame records including the time fields 564, 594, 634, 644, and 654 found in FIGS. 9.2.3, 9.3.3, 11.1, 11.2, and 11.3. In various embodiments, the time selected may be subsequent to the one or more times represented by the received one or more action-oriented time representations. In various embodiments the time selected may represent a time by which the one or more action-based instructions are to be implemented. In various embodiments, a time selected in blocks of code represents techniques to create predictions may additionally represent a prediction time indicating the time by which predicted action-based instructions may be expected or predicted to be received by the operator controllable device 12.

In various embodiments, the time selected is equivalent to a representation of the current time plus a fixed time step. The fixed time step may be equivalent to 20 milliseconds. In various embodiments, the fixed time step ranges from one millisecond to ten seconds. Those skilled in the art may select a fixed time step based on a number of conditions including network latency and task complexity. In some embodiments, a fixed time step ranges from five milliseconds to five hundred milliseconds. In some embodiments, the fixed time step ranges from several minutes to several hours.

In various embodiments, the time selected is equivalent to a representation of the current time plus a variable time step. In various embodiments, a variable time step is selected according to one or more conditions that include, by way of example only, network conditions such as latency and packet loss. In various embodiments, a variable time step is selected to be equal to network latency, which may, for example, be reported by a standard software package familiar to one of ordinary skill in the art, such as, for example, a "ping" program. In some embodiments, a variable time step is selected to be proportional to the minimum time delay between the sending and receiving of device control information within the system. In some embodiments, the time selected is proportional to the sum of a fixed and a variable time step.

Polynomial Estimation

In various embodiments, blocks of program code, implementing the method depicted in flowchart 207B, may direct the device processor 40 to generate predicted action-based instructions. In various embodiments, at block 220 the device processor 40 fits one or more polynomials to ordered sets of past values from the device control information. In block 220 the device processor 40 may read an ordered set of motor position values, each associated with a time, from the device control information stored in the location 82 of the variable memory 44 and to use the motor position values and associated times to fit one or more polynomials to determine a motor position based on a time.

For example, in one embodiment, device control information stored in the location 82 of the variable memory may include an ordered data structure such as the exemplary partial event series array 500 shown in FIG. 8. The event series array data structure may include an action-oriented time representation array 506 and a values array 508 (e.g., an action based instruction array) associated with a first motor, as shown in FIG. 8. In some embodiments, at block 220 of the flowchart 207B of FIG. 7.2 the device processor read motor position values including 524, 526, and 528 and associated times including 518, 520, and 522 from the event series array data structure and to use the motor position values and associated times to determine coefficients for a polynomial for motor position value. For example, coefficients $A_2$, $B_2$, and $C_2$ are for fitting a second degree polynomial to the motor position values including 524, 526, and 528 and associated times including 518, 520, and 522. The second degree polynomial may be expressed as:

$$d_2 = A_2 + B_2 t + C_2 t^2 \qquad (1)$$

where $d_2$ is a motor position value and t is time.

In some embodiments, block 220 may direct the device processor 40 to determine coefficients $A_1$ and $B_1$ for a first degree polynomial, $d_1 = A_1 + B_1 * t$ and/or coefficient $A_0$ for a zeroth degree polynomial, $d_0 = A_0$. Block 220 may direct the device processor 40 to use a least squares fit to determine coefficients. For example, in some embodiments, block 220 may direct the device processor 40 to call code, for example, a third party library program, such as the "polyfit" function of the NumPy library to determine the coefficients.

Block 220 may direct the device processor 40 to store the determined coefficients in one or more records, such as the exemplary polynomial coefficient record 540 shown in FIG. 9.2.1, in location 84 in the variable memory.

In various embodiments, if the "polyfit" function is unable to fit a polynomial of a particular degree, block 220 may direct the device processor to fit a polynomial of a lower degree. In such circumstances, polynomial coefficient records associated with polynomials of unfit degrees may be discarded. In various embodiments, the "polyfit" function may at one time be able to fit a polynomial of a degree (or order) that it was previously not able to, such as when additional device control information has been received. In such circumstances, new polynomial coefficient records may be created.

In various embodiments, block 220 may direct the device processor 40 to generate relative time values for each of the action-oriented time values stored in the partial event series array 500 and pass these relative time values to the "polyfit" function. In embodiments where the action-oriented time representation array 506 is implemented as an array object from the NumPy library, this may be accomplished by a subtraction of the action-oriented time representation associated with a first field (i.e., the time value found in field 518) from each of the time values stored in the array object as it is passed to the "polyfit" function.

For illustrative purposes, referring to FIG. 8, by way of example the position and associated time values occurring for indices in the data structure shown in FIG. 8 between fields 514 (index 1) and 516 (index 12) may increase linearly at a constant rate. This linear constant rate may be 0.012 per index position for position fields and 0.02 per index position for time fields. Therefore the position and time values associated with an index of 2 would be 0.524 and 1435273535.394, respectively, and this trend would continue until the values associated with field 516 (index 12).

In the above example, block 220 may direct the device processor to execute the "polyfit" function using these values. Block 220 may direct the device processor to pass the "polyfit" function the action-oriented time representation array 506 (normalized by the first action-oriented time representation found in field 518 as described above), the values array 508, and a second degree polynomial. The "polyfit" function may then return an array containing values approximately equal to 0.5, 0.6, and 0.0, representing the coefficients $A_2$, $B_2$, and $C_2$ as described above. Block 220 may then direct the device processor 40 to copy these coefficients into fields 542, 544, and 546, respectively, of the exemplary polynomial coefficient record 540 shown in FIG. 9.2.1, which may be stored as conditioned device control information in the location 84 of the variable memory.

In various embodiments, block 220 may direct the device processor to execute the "polyfit" function multiple times to fit more than one polynomial and calculate more than one set of coefficients. In the above example, block 220 may direct the device processor to execute the "polyfit" function in a similar manner to fit a zeroth degree polynomial, and the function may return a single coefficient $A_0$ approximately equal to 0.572 as described above. Similarly, the "polyfit" function may return coefficients $A_1$ and $B_1$, approximately equal to 0.5 and 0.6, as described above in calculating a first degree polynomial.

As described above regarding block 210, in various embodiments block 222 may direct the device processor 40 to select a prediction time later than the time associated with the newest position representations contained in the device control information stored in the location 82 of the variable memory 44. In various embodiments prediction times associated with predicted positions may be later than a current time. In one embodiment, block 222 may direct the device processor 40 to copy a prediction time equal to the current time plus a fixed time step, which may, for example be 10 milliseconds, into field 564 of a partial conditioned device control information frame record 560 shown in FIG. 9.2.3. As described above, fixed and/or variable time steps may be used and may vary significantly.

In various embodiments, using a prediction time later than the current time may allow the system to initiate motor movements on the operator controllable device similar to those that may be or have been captured by the operator interface 14 but before such movements have been received by the operator controllable device 12. In various embodiments, the system may therefore allow the operator controllable device to move in a manner similar to movements captured by the operator interface but with greater temporal congruency.

Block 222 then directs the device processor 40 to generate predicted positions using one or more polynomials. Block 222 may direct the device processor to generate a predicted motor position value using each of the one or more polynomials fit in block 220. For example, in one embodiment one or more polynomial coefficient records such as the coefficient record 540 shown in FIG. 9.2.1 may be generated in block 220 and stored in the location 84 of the variable memory 44. In some embodiments, block 222 directs the device processor 40 to generate predicted positions $d_0$, $d_1$, and $d_2$ using zeroth, first, and second degree polynomials respectively as follows:

$$d_0 = A_0$$

$$d_1 = A_1 + B_1 t$$

$$d_2 = A_2 + B_2 t + C_2 t^2 \qquad (2)$$

where t is a prediction time for which the positions $d_0$, $d_1$, and $d_2$ are predicted and $A_0$, $A_1$, $B_1$, $A_2$, $B_2$, and $C_2$ are polynomial coefficients. Block 222 directs the device processor to determine $A_0$, $A_1$, $B_1$, $A_2$, $B_2$, and $C_2$ from polynomial coefficient records, such as the polynomial coefficient record 540 shown in FIG. 9.2.1. For example, fields 542, 544, and 546 of the record 540 may store values which can be used as coefficients $A_2$, $B_2$, and $C_2$ respectively. Block 222 may direct the device processor to store the positions $d_0$, $d_1$, and $d_2$ as records in the location 84 of the variable memory, for example.

In some embodiments, fewer or additional polynomials may be used to determine fewer or additional predicted positions.

In various embodiments, block 224 may then direct the device processor 40 to calculate a weighted average position using weights associated with polynomials of various degrees and the associated predicted position values calculated in block 222.

In one embodiment, and by way of example only, the weights associated with the position values predicted using polynomials of zeroth, first, and second degrees are 0.3, 0.5, and 0.2, respectively. In some embodiments, the weights associated the polynomial terms of zeroth, first, and second degree decrease in magnitude with higher degree.

In various embodiments block 224 may direct the device processor 40 to store weights associated with polynomials of various degrees in location 84 of the variable memory 44. FIG. 9.2.2 shows an exemplary polynomial weight record 550 including weights 552, 554 and 556, and respective values 0.3, 0.5 and 0.2, associated with polynomials of zeroth, first, and second degrees, respectively.

In various embodiments, block 224 may direct the device processor to generate a weighted average position by calculating the sum of the positions predicted by each polynomial for the selected prediction time multiplied by the weight associated with each polynomial and then divide by the sum of the associated weights. The positions predicted for each polynomial for the selected prediction time may be calculated by a call to the "polyval" function in the NUMPY library, available from the NumPy Developers at www.numpy.org, and providing the "polyval" function a prediction time (which may have been copied to field 564 of the partial device control information frame record 560) and the polynomial coefficient record 540 associated with the given polynomial. In various embodiments where coefficients have been calculated using relative time values, a relative time value may be calculated by a subtraction of the action-oriented time representation found in field 518 from the prediction time. The relative time value may be passed to the "polyval" function. The "polyval" function may then return a predicted position associated with the prediction time, which block 224 may direct the device processor 40 to multiply by the weight associated with the polynomial. Analogous steps may occur for each polynomial and the result values may be summed and divided by the sum of the associated weights to generate a weighted average. In instances where the "polyfit" function was unable to fit a polynomial of a certain degree, polynomial coefficient records and associated weight may be discarded prior to the weighted average calculation.

In various embodiments, block 224 may then direct the device processor 40 to copy the resulting weighted average position values for each motor into one or more records, such as the exemplary partial conditioned device control information frame record 560 shown in FIG. 9.2.3, in location 84 of the variable memory 44. By way of example, the block 224 may direct the device processor to copy a weighted average motor position value associated with motor 1 into field 562 of the partial device control information frame record 560. As described above, block 222 may have copied a time value into field 564.

Combining Multiple Approaches

In various embodiments, the blocks of code depicted in flowchart 207C may direct the device processor 40 to generate predictions using a plurality of approaches and to combine them into a single predicted value for each motor and/or output device.

In various embodiments, block 230 may direct the device processor 40 to generate a plurality of predictions using more than one approach. By way of example only, block 230 could direct the device processor to generate predictions by executing the blocks of code found in flowcharts 207A and 207B. As described above, the predicted values, a result from the execution of blocks of code depicted in flowcharts 207A and 207B, may be stored in device control information records such as those illustrated in FIGS. 9.1.1 and 9.2.3 in location 84 of the variable memory 44. As described above, block 230 may direct the device processor to store a prediction time in field 594 of a device control information frame record in location 84 of the variable memory 44. This prediction time may be equivalent to the prediction time used by blocks of code depicted in flowcharts 207A and 207B which when executed generate predictions.

Block 230 may then direct the device processor to copy one or more predicted positions into one or more model value records such as the exemplary model value record 570 shown in FIG. 9.3.1. By way of example only, block 230 may direct the device processor to copy a static prediction value from field 532 show in FIG. 9.1.1 into field 572 for model 0 in the exemplary model value record 570 shown in 9.3.1. Block 230 may then direct the device processor to copy a polynomial prediction value from field 562 shown in FIG. 9.2.3 into field 574 for model 1 in the exemplary model value record 570.

Block 230 may additionally direct the device processor 40 to store one or more records in location 84 of the variable memory 44 such as the exemplary model weight record 580 shown in FIG. 9.3.2. The weight fields 582 and 584 associated with models 0 and 1, respectively, may represent a relative weight associated with a particular model. By way of example only, equal weights of 0.500 may be associated with model 0 (static prediction) and model 1 (polynomial prediction).

In various embodiments, block 232 may direct the device processor 40 to calculate weighted average values for one or more motor and/or output devices in a manner generally similar to that described for block 224. In particular, predicted positions associated with one or more models may be multiplied by associated weights, with the result summed and then divided by the sum of the weights.

In various embodiments, Block 232 may then direct the device processor 40 to copy the resulting weighted average position into field 592 of the exemplary partial conditioned device control information frame record 590 found in location 84 of the variable memory 44.

Operations to Smooth

In various embodiments, blocks of code depicted in flowcharts 207D, 207E, and 207F may direct the device processor 40 to condition action-based instructions by applying operations to filter the action-based instructions. In various embodiments, operations to filter may reduce the difference between proposed action-based instructions and historical values representing action-based instructions that may have already been implemented by one or more motors and/or output devices.

In various embodiments, blocks of code depicted in flowcharts 207D, 207E, and 207F may consider discrepancies between environment sensor information contained in location 80 of the variable memory 44 and action-based instructions or conditioned action-based instructions found in locations 82 or 84 of the variable memory 44, respectively. This specification describes operations to filter action-based instructions performed on action-based instructions found in location 84 of the variable memory 44, i.e., those that have been conditioned, however similar operations may be performed on other action-based instructions such as those found in location 82 of the variable memory 44, i.e., those that have not been conditioned.

In various embodiments, operations to filter action-based instruction may cause the device's motion to appear less jerky to operators and other individuals that interact with the system. In various embodiments, these operations to smooth may include a variety of methods such as, by way of example only, imposing a maximum rate of change on action-based instructions that represent changes in motor position values, or applying linear filters on action-based instructions, or applying Kalman filters on action-based instructions, or a combination of these methods.

In various embodiments, the blocks of code depicted in flowcharts 207D, 207E, and 207F may direct the device processor 40 to store smoothed action-based instructions—which may be derived using environment sensor information found in location 80 of the variable memory 44 and action-based instructions found in location 84 of the variable memory 44—as conditioned device control instructions in location 84 of the variable memory 44. Therefore, in various embodiments, the block of code depicted in flowcharts 207D, 207E, and 207F conditions action-based instructions by performing operations to filter action-based instructions or conditioned action-based instructions found in location 82 or location 84 of the variable memory 44.

Rate-of-Change Limiting

In various embodiments, blocks of code depicted in flowchart 207D may direct the device processor 40 to condition action-based instructions by imposing a maximum rate of change. In various embodiments, this may be achieved with a comparison of environment sensor information stored in location 80 of the variable memory 44 with action-based instructions to be implemented, which may be found in locations 84 of the variable memory 44. In various embodiments, resulting conditioned action-based instructions may be generated that do not exceed a maximum rate of change.

In various embodiments, block 240 may direct the device processor 40 to calculate the rate of change required for one or more motors and/or output devices to implement action-based instructions found in location 84 of the variable memory 44. Block 240 may direct the device processor to calculate the rate of change suitable to implement action-based instructions with a comparison of environment sensor information in location 80 of the variable memory 44 with action-based instruction representations in location 84 of the variable memory 44.

As described above, blocks of code depicted in flowcharts 207A, 207B, and 207C may direct the device processor 40 to store conditioned action-based instructions in records such as the exemplary partial device control information frame records 530, 560, and 590 in location 84 of the variable memory 44. As described below, block 902 may direct the device processor 40 to store environment sensor information in an ordered data structure such as the exemplary event series array 400 illustrated in FIG. 6. Block 240 may therefore direct the device processor 40 to calculate suitable rates of change with a comparison of values stored in these locations.

By way of example only, an exemplary partial event series array 600, a data structure, including environment sensor information, particularly motor position and time information for one motor, is shown in FIG. 10. The partial event series array 600 includes key 602, array 604, such as array 606 and array 608, indices 612, 614, 616, and 617, a row 610 to store the indices, and values such as position value 618 in array 606 at index 0. As described regarding flowchart 207C, an exemplary partial conditioned device control information frame record 590 including an action-based instruction and an associated action-oriented time representation is shown in FIG. 9.3.3. Block 240 may direct the device processor to calculate the rate of change which would be suitable by the conditioned device control information frame record 590 with a comparison of the position and time representations associated with the last index having a value in the exemplary partial event series array 600 with the position and time representations in the exemplary partial device control information frame record 560.

In particular, block 240 may direct the device processor to calculate the rate of change as the difference in position, calculated with a subtraction of the position value found in field 628 shown in FIG. 10 from the position value found in field 592 shown in FIG. 9.3.3, divided by the difference in time, calculated by subtracting the time value found in field 622 shown in FIG. 10 from the time value found in field 594 shown in FIG. 9.2.3. By way of example only, the change in position may be 0.087 (0.731–0.644), the change in time may be 0.02 (1435273535.614–1435273535.594), and therefore the rate of change may be 4.35 (0.087/0.02).

In various embodiments, block 242 may then direct the device processor to condition action-based instructions by enforcing a maximum rate of change. The maximum rate of change may be 1.5, representing approximately 540 degrees per second where a range of motion of 360 degrees is normalized onto 0-1 values, such normalization occurring as described elsewhere in this specification. In various embodiments, the maximum rate of change may be equivalent to a rate of change in the range of one degree per second to 3600 degrees per second. Those skilled in the art may select values based on a number of environment and embodiment-specific conditions including but not limited to the size and weight of the embodiment, the power of the motors and/or output devices, network latency and packet loss. In some embodiments and environments, a maximum rate of change equivalent to a rate of change in the range of 180 degrees per second to 1440 degrees per second may be selected by those skilled in the art. In yet other embodiments and environments, a maximum rate of change equivalent to more than ten full revolutions per second may be selected.

In various embodiments, block 242 may direct the device processor 40 to modify action-based instructions found in location 84 of the variable memory 44. In circumstances where the rate of change required to implement an action-based instruction does not exceed the maximum rate of change, no such modification may be necessary. In other circumstances where required rates of change exceed maximum rates of change, block 242 may direct the device processor 40 to copy one or more new values to replace action-based instructions found in location 84 of the variable memory 44.

In various embodiments, block 242 may direct the device processor 40 to copy values into records in location 84 of the variable memory 44 such as the exemplary partial conditioned device control information frame record 590 shown in FIG. 9.3.3. In such embodiments, a representation of a new limited action-based instruction value may be copied into field 592.

In various embodiments, block 242 directs the device processor 40 to generate limited action-based instructions by calculating a position that would require moving at the maximum rate of change. In some embodiments this may be accomplished by adding a new change in position, calculated by multiplying the maximum rate of change by the change in time, to the most recently recorded position for a motor and/or output device. By way of example only, the new change in position may be 0.03, representing the maximum change in position 1.5 multiplied by the change in time 0.02, which may be added to the last motor position value 0.644 found in field 628 of the exemplary partial event series array 600 shown in FIG. 10. A resulting exemplary conditioned partial device control information frame record 630 containing a conditioned action-based instruction for motor 1 with value 0.647 (in field 632) is shown in FIG. 11.1 and may be stored in location 84 of the variable memory 44. The exemplary conditioned partial device control information frame record 630 includes an associated time value in field 634.

In various embodiments, block 240 may direct the device processor to condition values in accordance with the direction of a change. Therefore, if the required rate of change calculation yields a negative value, its absolute value may be compared to the maximum rate of change and any limited action-based instructions may be subtracted from the most recently recorded position for a motor and/or output device.

Linear Filters

In various embodiments, blocks of code depicted in flowchart 207E may direct the device processor 40 to condition action-based instructions by applying linear filters. In various embodiments this may be accomplished using linear filters based on correlation coefficients which represent or characterize a balance between the most recent environment sensor information found in location 80 of the variable memory 44 and action-based instructions found in locations 84 of the variable memory 44. Examples of the correlation coefficients include the "r coefficient" or the Pearson product-moment correlation coefficient, a measure of the linear correlation between two variables.

As described for block 240, in various embodiments block 250 may direct the device processor to access an exemplary partial event series array 600 show in FIG. 10 containing environment sensor information, particularly historical motor position and time information, and an exemplary partial device control information frame record 590 shown in FIG. 9.3.3 containing an action-based instruction for one motor and an associated time.

In various embodiments, block 250 may direct the device processor 40 to calculate decay ratios based on the correlation coefficients and the most recent motor position and time information associated with a motor and/or output device. The decay ratio may be used to compute weights for computing an average over a position associated with the action-based instructions and a value predicted by a linear model. In various embodiments, the correlation coefficient may have a value of 30, or may range from 0.01 to 100. Those skilled in the art may select values based on a number of environment- and embodiment-specific conditions including but not limited to the size and weight of the embodiment, the power of the motors and/or output devices, network latency and packet loss. In some embodiments and environments, an "r coefficient" in the range of 0.5 to 50 may be selected by those skilled in the art. In yet other embodiments and environments, significantly greater or smaller values may be selected. Generally the value selected by those skilled in the art may be a value that results in smooth operation of the operator controllable device 12 in a variety of conditions.

In various embodiments, block 250 may direct the device processor to calculate a change in time based on a comparison of values found in locations 80 and 84 of the variable memory 44. As described for block 240, in some embodiments, a change in time may be calculated from a subtraction of a time value found in field 594 shown in FIG. 9.3.3 from a time value found in field 622 shown in FIG. 10. By way of example only, in the embodiment shown in FIGS. 9.3.3 and 10, the change in time may be 0.02 seconds.

In various embodiments, block 250 may direct the device processor 40 to calculate a decay ratio based on an exponential function. For example, the ratio proportional to a decaying exponential. For example:

$$e^{(-\alpha \cdot \Delta t \cdot r)} \tag{3}$$

where a is a constant, r is the correlation coefficient and e is the generally known base of the natural logarithm. In various embodiments, different values are used for the exponential base. By way of example only, the decay ratio may be calculated as $e^{(-0.02*30)}$ yielding a ratio value of approximately 0.549.

In various embodiments, block 252 may direct the device processor 40 to use the ratio determined in block 250 in calculating a weighted average between environment sensor information found in location 80 of the variable memory 44 and action-based instructions found in location 84 of the variable memory 44. In various embodiments, the calculated ratio acts as the weight associated with the value included in the action-based instruction whereas a weight associated with the most recent position stored for a motor and/or output device is equal to the number 1 minus the calculated ratio. In various embodiments, the weighted average may therefore be closer to the action-based instruction when the difference in time is small or, in the alternative, closer to the last recorded position when the difference in time is great.

By way of example only, block 252 may therefore direct the device processor 40 to calculate a weighted average from a sum of the product of the determined weights and the action-based instruction value stored in field 592 (e.g., 0.549*0.731=0.401) and the product of 1 minus the ratio and the last position value in field 628 (e.g., (1−0.549) *0.644≈0.290). The device process 40 may divide the result by the sum of the weights (1). Therefore, by way of example only, the resulting weighted average may be approximately 0.691.

In various embodiments, block 252 may then direct the device processor 40 to copy the weighted average into a conditioned device control information frame record such as the exemplary partial conditioned device control information frame record 640 in location 84 of the variable memory 44. As described above, this approach may be used to condition one or more action-based instructions associated with one or more motor and/or output devices. In this example, the exemplary partial conditioned device control information frame record 640 includes a value and an associated time value in fields 642 and 644.

In various embodiments, one or more operations to filter action-based instructions such as those depicted in flowcharts 207D, 207E, and 207F may be used in conjunction. For example, the device processor 40 may direct the conditioned action-based instructions resulting from the application of one or more linear filters described above to receive a rate-of-change limit by executing blocks of code depicted in flowchart 207D. In such embodiments, the use of multiple operations to filter action-based instructions may result in more smooth operation of the operator controllable device 12 than for one operation alone.

Kalman Filters

In various embodiments, blocks of code depicted in flowchart 207F may direct the device processor 40 to condition action-based instructions using Kalman filters.

In various embodiments, block 260 may direct the device processor 40 to initialize Kalman filters for one or more motors and/or output devices for which the operator controllable device 12 may receive action-based instructions representing position values as inputs. In some embodiments, block 260 may direct the device processor 40 to create Kalman filters to additionally accept rate of change data estimated from position data as an input.

In various embodiments, block 260 may initialize Kalman filters using linear algebra libraries, and statistical libraries. In various embodiments, block 260 may make use of a third party library such as PYKALMAN, available from pykalman.github.com. Block 260 may use estimates of variance of position information and variance of rate of change information as input parameters. In various embodiments, by way of example only, the estimates of the variance of position information may be $5^2$ and the variance of rate of change information may be $50^2$. In various embodiments, other input parameters may be necessary to accommodate two variables, e.g., position and rate of change. By way of example only, input parameters may include a transition matrix having values represented by [[1.0, dt], [0.0, 1.0]] where dt represents a time step such as 0.1 seconds. Therefore, in some embodiments, the Kalman filter may track position changes as a function of velocity according to a certain fixed time step. Those skilled in the art may select additional or different input parameters for Kalman filters that are appropriate given both the environment and the specific embodiment.

In various embodiments, block 262 may direct the device processor 40 to update Kalman filters, such as by making a call to the "filter update" function in PyKalman. Block 262 may direct the device processor to update Kalman filters using environment sensor information stored in location 80 of the variable memory 44. In various embodiments, Kalman filters may need to be updated multiple times in accordance with the fixed time step in order to reach the most recent time with which environment sensor information is stored in location 80 of the variable memory 44. In such embodiments, one or more updates to Kalman filters for each fixed time step may require a search over an ordered data type to find a time representations closest to that time step.

By way of example, block 902 described below may have directed the device processor 40 to store environment sensor information in an exemplary partial event series array 600. Block 262 may direct the device processor 40 to determine indices associated with the closest time representations contained in a time representation array, such as, array 606. Block 262 may then direct the device processor 40 to calculate an estimated position value for a target time step considering the closest values. In one embodiment, block 262 may direct the device processor 40 to generate an interpolated value using a function such as the "interp" function in the NumPy library. Block 262 may then direct the device processor 40 to update the Kalman filter using such values associated with one or more fixed time steps until the Kalman filter has been updated with the most recent position information contained in the exemplary partial event series array 600.

In various embodiments, block 264 may then direct the device processor 40 to generate smoothed action-based instructions by by creating an update to the Kalman filter with predicted action-based instructions found in location 84 of the variable memory 44. In various embodiments, predicted action-based instructions may be stored in device control information records such as field 592 of the exemplary partial device control information frame record 590 shown in FIG. 9.3.3.

In various embodiments, block 264 may direct the device processor 40 to obtain a filtered (e.g., smoothed) value from the Kalman filter. In various embodiments, the "filter update" function may return filtered values, which block 264 may then direct the device processor to store in records in location 84 of the variable memory 44 such as the exemplary partial conditioned device control information frame record 650 shown in FIG. 11.3. As shown, the exemplary partial conditioned device control information frame record 650 includes value 0.701 (in field 652) and an associated time value (in field 654).

Producing Signals for to Implement Conditioned Action-Based Instructions

Block 208 shown in FIG. 4 then directs the device processor 40 to produce signals for causing the operator controllable device 12 shown in FIG. 2 to take action based on the conditioned device control information including one or more action-based instructions. In various embodiments, block 208 may direct the device processor 40 to produce signals for causing the operator controllable device 12 to simulate or replicate at least one action taken by an operator experiencing a representation or simulation of the environment of the operator controllable device 12.

In various embodiments, block 208 of FIG. 4 may direct the device processor 40 to read the representation of the conditioned device control information from the location 84 of the variable memory 44 shown in FIG. 2 and to produce signals based on the conditioned action-based instructions for causing at least one actuator or output device of the operator controllable device 12 to take action.

For example, in various embodiments records such as one or more of the partial conditioned device control information frame records 530, 560, and 590 shown in FIGS. 9.1.1, 9.2.3, and 9.3.3 respectively may be included in a conditioned device control information stored in the location 84 of the variable memory 44 shown in FIG. 2. The conditioned device control information frame record may have a format generally similar to the exemplary device control information frame record 300 shown in FIG. 5. Block 208 of FIG. 4 may direct the device processor 40 to read conditioned device control information from the conditioned device control information frame record and cause the operator controllable device 12 to act in accordance with the conditioned device control information Block 208 of FIG. 4 may direct the device processor 40 to read audio information from the speaker control field of the conditioned device control information frame record and to produce signals which cause the speaker 52 of the operator controllable device 12 to output audio represented by the audio information. In various embodiments, causing the output of the audio represented by the audio information, the speaker 52 may be providing a simulation of audio input sensed by the microphone 112 of the operator interface 14 and cause the speaker 52 to act analogously to a vocal apparatus of an operator interacting with the operator interface 14.

In various embodiments, block 208 of FIG. 4 may direct the device processor 40 to produce signals for causing one or more of the first, second, third, fourth, fifth, and sixth servomotors of the motors 48 to take action based on the values stored in the motor control fields of the conditioned device control information frame record to cause the motors 48 to move to positions that correspond to the positions represented by the values stored in the motor control fields. In various embodiments, by causing the operator controllable device 12 to move in accordance with the motor control fields, the first, second, third, fourth, fifth, and sixth servomotors of the motors 48 may cause the operator controllable device 12 to act analogously to an operator interacting with the operator interface.

In various embodiments, the first and second servomotors may cause the mechanical neck of the operator controllable device 12 to move based on the values stored in the motor control fields such that the mechanical neck moves analogously to the neck of the operator interacting with the operator interface 14. The third and fourth servomotors may cause the mechanical shoulder of the operator controllable device 12 to move based on the values stored in the motor control fields such that the mechanical shoulder moves analogously to the shoulder of the operator. The fifth servomotor may cause the mechanical elbow of the operator controllable device 12 to move based on the values stored in the motor control field such that the mechanical elbow moves analogously to the elbow of the operator, and the sixth servomotor may cause the gripper of the operator controllable device 12 to move based on the value stored in the motor control field such that the gripper moves analogously to a hand of the operator.

Figures 14, 15:
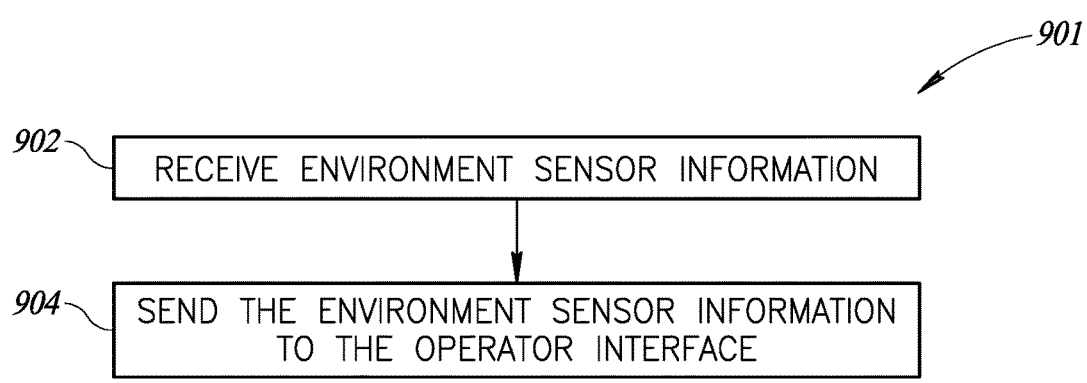
FIG. 14 is a representation of an exemplary operator interface sensor frame record for use in the system shown in FIG. 1.
FIG. 15 is a flowchart depicting blocks of code for directing the operator controllable device shown in FIG. 2 to facilitate device control.

Supporting and Additional Functionality
Receiving Environment Sensor Information In some embodiments, the operator controllable device 12 shown in FIG. 1 may send environment information to the operator interface 14. Referring now to FIG. 15 there is shown a flowchart 901 depicting blocks of code which when executed direct the device processor 40 shown in FIG. 2 to send environment information, or cause environment information to be sent. The blocks of codes may be arranged as functions in accordance with one embodiment. The flowchart 901 may be encoded in the block of codes 60 shown in FIG. 2 for directing the device processor 40 to effect operator controlled functions. In various embodiments, the flowchart 901 may be executed periodically, for example, concurrently with or before the flowchart 200 shown in FIG. 4 is executed.

The flowchart 901 begins with block 902 which directs the device processor 40 shown in FIG. 2 to receive environment sensor information that represents an environment of the operator controllable device 12 or aspects of that environment. In various embodiments, block 902 may direct the device processor 40 to store a representation of the received environment sensor information in the location 80 of the variable memory 44 shown in FIG. 2.

In various embodiments, block 902 of FIG. 15 may direct the device processor 40 of FIG. 2 to store the representation of the environment sensor information as one or more device environment frame records, with each frame record associated with a time. In various embodiments, the frame records may be sampled at a frame rate, which in some embodiments may be, for example, 30 frames per second such that the representation of the environment sensor information may include 30 frame records for every second (or in other embodiments, in fewer or greater frames per second).

FIG. 12 depicts an exemplary device environment frame record 700 used to store and organize environment sensor information collected by the operator controllable device 12 or components thereof from the environment in which the operator controllable device 12 is situated in accordance with one embodiment. The device environment frame record 700 includes a left image field 702, a right image field 704, a left audio field 706, a right audio field 708, a first motor position field 710, a second motor position field 712, a third motor position field 714, a fourth motor position field 716, a fifth motor position field 718, a sixth motor position field 720, and a time field 722. In some embodiments, separate frame records may be used for any subset of information included in the device environment frame record 700 shown in FIG. 12.

In various embodiments, block 902 shown in FIG. 15 may direct the device processor 40 to query the cameras 46 shown in FIG. 2 and receive image information from the cameras 46. As discussed above, the cameras 46 may include left and right cameras and thus the image information may include left and right image information. In various embodiments, each of the left and the right image information may include a representation of one or more images which may, for example be 640×480 pixel RGB images. In other embodiments, greater or lesser resolutions may be used. For example, in some embodiments, the images may each have a resolution of between about 640×480 and 1920×1080. In some embodiments, the images may have a resolution of 1024×576, for example. Block 902 may direct the device processor 40 to store the left and right image information in the left and right image fields 702 and 704 of the device environment frame record 700 shown in FIG. 12.

In various embodiments, the environment of the operator controllable device 12 may include an item (by way of example only, a coffee cup), and the left and right image fields 702 and 704 of the device environment frame record 700 may store image information that represents two different views of the item.

In various embodiments, block 902 shown in FIG. 15 may direct the device processor 40 to query the microphones 50 shown in FIG. 2 and receive audio information from the microphones 50. As discussed above, the microphones 50 may include left and right microphones and thus the audio information may include left audio information and right audio information. In various embodiments, the audio information may be sampled at the frame rate of 30 frames per second, for example. The microphones 50 may capture audio signals at or about 22 kHz and so, in various embodiments, each of the left and right audio information may include approximately 733 subsamples. Block 902 may direct the device processor 40 to store representations of the left and right audio information in the left (706) and right audio fields (708) of the device environment frame record 700 shown in FIG. 12.

In various embodiments, the environment of the operator controllable device 12 collected may include a contextual sound wave communication, such as a person asking "How is the coffee?", and the left (706) and right audio fields (708) of the device environment frame record 700 may store audio information that represents the sound wave communication sensed from the microphones 50.

In various embodiments, block 902 shown in FIG. 15 may direct the device processor 40 to query the motors 48 shown in FIG. 2 and receive position information from the motors 48. As discussed above, the motors 48 may include two neck servomotors (one yaw neck servomotor and one pitch neck servo motor), one gripper servomotor, one elbow servomotor, and two shoulder servomotors, and each of the servomotors may sense an angle that represents an angle or position of the motor. In various embodiments, block 902 may direct the device processor 40 to receive a value for each of the servomotors included in the motors 48, the value representing a position of the particular servomotor.

Block 902 may direct the device processor 40 to store the values representing the positions of the servomotors in the motor position fields 710, 712, 714, 716, 718, and 720 of the device environment frame record 700. In various embodiments, the motor position fields 710, 712, 714, 716, 718, and 720 may act as a position vector defining a position associated with the operator controllable device 12. In the embodiment shown, each of the values is a decimal number between 0 and 1, where 0 may represent a home position for the motor, 0.5 representing a mid-point rotation and 1 representing a maximal rotation. The mid-point rotation may be 180 degrees and the maximal rotation may be 360 degrees, for example. The effective range or maximal rotation of the motors in various embodiments may be different from 360 degrees as in the example above. In such a case the normalized 0-1 values would simply be normalized with respect to the effective range of the motor in question. In general, motors on embodiments of the operator controllable device may be explicitly limited to a maximal degree of rotation, whether this was done to simulate the range of the analogous human limb, or for an alternate reason. For example, DYNAMIXEL™ servo-motors such as MX-28, MX-64, or AX-12 servo-motors produced by ROBOTIS CO. LTD. of Seoul, South Korea, have an effective range of 300 degrees. In some embodiments, each joint on a device may be explicitly limited to have a particular range, generally less than the maximum allowable by the motor (e.g., for DYNAMIXEL™ servo-motors, 300 degrees).

Block 902 shown in FIG. 15 may also direct the device processor 40 shown in FIG. 2 to store a representation of a time, at which the information stored in the fields 702-720 of the device environment frame record 700 was sampled, in the time field 722. In the embodiment shown in FIG. 12, the format of the representation stored in the time field 722 is a typical timestamp format, familiar to those skilled in the art, which represents a time and date where the time is accurate to a thousandth of a second although other degrees of accuracy may be used in various embodiments.

Storing Environment Sensor Information for Use in Conditioned Actions

In various embodiments, block 902 shown in FIG. 15 may direct the device processor 40 shown in FIG. 2 to store environment sensor information that represents an environment of the operator controllable device 12 or aspects of that environment at various points in time in location 80 of the variable memory 44.

In various embodiments, block 902 shown in FIG. 15 may direct the device processor 40 shown in FIG. 2 to store environment sensor information in location 80 of the variable memory 44 such that it is ordered by the time at which it was captured. In one embodiment, block 902 may direct the device processor 40 to store the environment sensor information in an ordered data structure such as, by way of example only, the exemplary partial event series array 600 illustrated in FIG. 10.

In various embodiments, block 902 may therefore direct the device processor 40 to store environment sensor information including motor position information and associated time representations in two or more associated arrays for one or more motor and/or output devices. In various embodiments, the two or more associated arrays are strictly-typed which may further facilitate deriving conditioned actions or the rate at which conditioned action occur.

Block 902 may therefore direct the device processor 40 to store representations of motor position information and representations of the time at which the associated motor position information was captured in location 80 of the variable memory 44. In some embodiments, block 902 may direct the device processor 40 to store multiple associated arrays containing representations of environment sensor information and associated time information, each array represents the environment sensor information associated with, for instance, the various motors 48 of the operator controllable device.

Sending Environment Sensor Information

Referring to FIG. 15, block 904 then directs the device processor 40 to send the environment sensor information to the operator interface 14. In various embodiments, block 904 may direct the device processor 40 to retrieve a representation of the environment sensor information from the location 80 of the variable memory 44 and send the representation to the operator interface 14 via the I/O interface 58 and the network 18, for example.

In some embodiments, block 904 may direct the device processor 40 may be executed periodically to send representations of new environment sensor information at an environment refresh rate which may, in some embodiments differ from the frame rate. For example, in various embodiments, block 904 may direct the device processor 40 to send representations of new environment sensor information to the operator interface 14 at 10 times per second and thus, where block 902 directs the device processor 40 to sample 30 device environment frame records per second, block 904 may direct the device processor 40 to send to the operator interface 14, three device environment frame records at a time, ten times per second.

Receiving Environment Sensor Information

Figure 13:
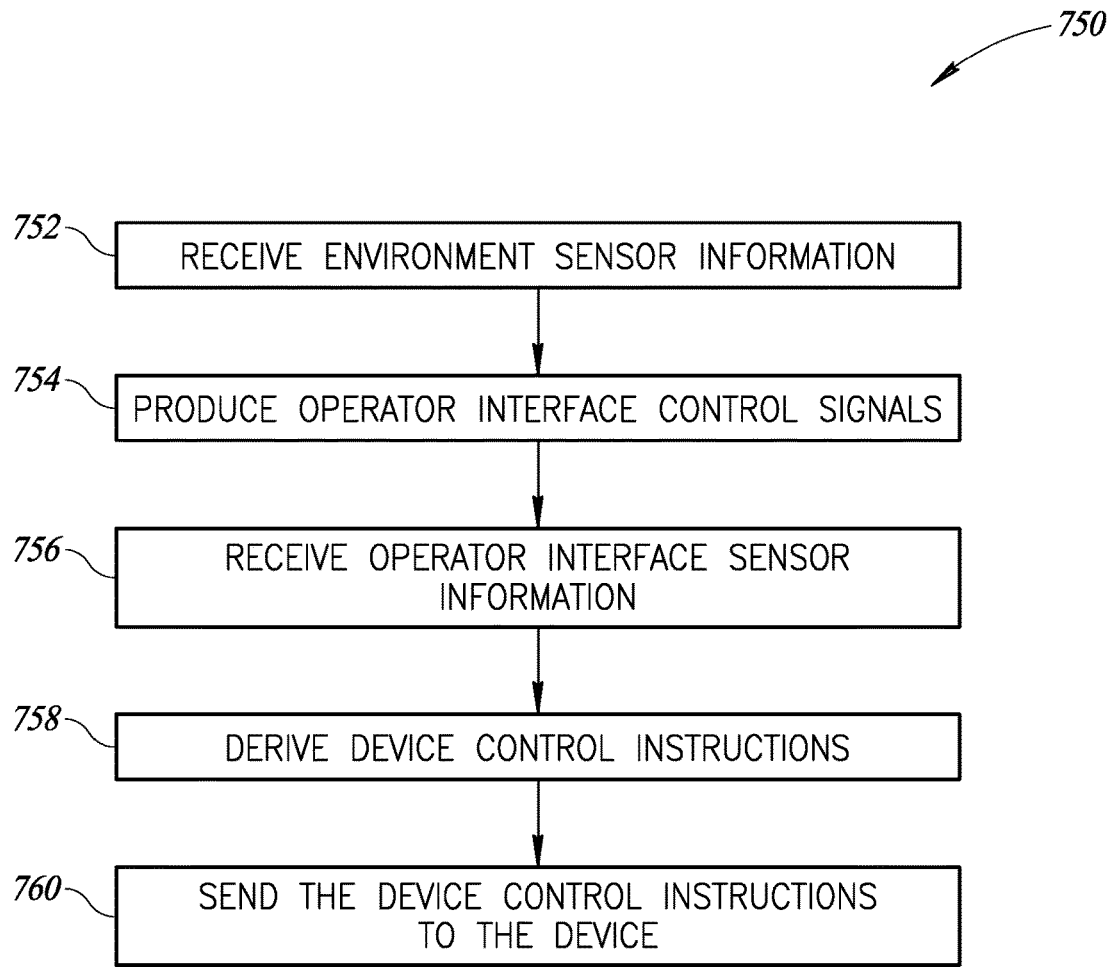
FIG. 13 is a flowchart depicting blocks of code for directing the operator interface shown in FIG. 3 to facilitate device control.

Referring now to FIG. 13, there is shown a flowchart 750 which may be carried out concurrently with flowchart 901. Flowchart 750 depicts blocks of code for directing the operator interface 14 shown in FIG. 3 to facilitate device control. Flowchart 750 may be encoded in the block of codes 140 shown in FIG. 3 for directing the operator interface processor 100 to effect device control.

Referring to FIG. 7, the flowchart begins with block 752 which, in various embodiments may be executed after block 904 shown in FIG. 15 has been executed. Block 752 directs the operator interface processor 100 shown in FIG. 3 to receive environment sensor information. In various embodiments, block 752 may direct the operator interface processor 100 to receive representations of environment sensor information that were sent by the device processor 40 at block 904 shown in the flowchart 901. Block 752 may direct the operator interface processor 100 to receive the representations of the environment sensor information via the network 18 and the I/O interface 120, for example. In various embodiments, block 752 may direct the operator interface processor 100 to store the representations of the environment sensor information in the location 160 of the variable memory 104 shown in FIG. 3.

Producing Operator Interface Control Signals

Block 754 directs the operator interface processor 100 to produce operator interface control signals derived from the environment sensor information. In various embodiments, the operator interface control signals encode information to cause the operator interface 14 to simulate the environment represented by the environment sensor information, for an operator interacting with the operator interface 14. In such embodiments, this may allow for the simulation and feedback to the operator via the operator interface 14 of some or more of the environmental conditions in which the operator controllable device 12 is situated as such environmental conditions are captured by the environmental sensor information communicated to the operator interface 14 from the operator controllable device 12.

In various embodiments, block 754 directs the operator interface processor 100 to retrieve the representations of the environment sensor information stored in the location 160 and to produce signals based on the representations.

For example, left and right displays of a virtual reality headset, which may be worn by the operator, may act as the displays 106. In various embodiments, for example, where a device environment frame record such as the device environment frame record 700 shown in FIG. 12 has been stored in the location 160 of the variable memory 104 shown in FIG. 3, block 754 may direct the operator interface processor 100 to produce signals for causing one or more images represented by the image information stored in the left image field 702 to be displayed by the left display of the virtual reality headset and block 754 may direct the operator interface processor 100 to produce signals for causing one or more images represented by the image information stored in the right image field 704 to be displayed by the right display of the virtual reality headset. Accordingly, in various embodiments, an operator wearing the virtual reality headset and interacting with the operator interface 14 may experience a binocular representation or simulation of the visual environment in which the operator controllable device 12 is situated.

The operator interface 14 may include headphones which may include left and right speakers and act as the speakers 110. In various embodiments, where a device environment frame record such as the device environment frame record 700 shown in FIG. 12 has been received and stored in the location 160 of the variable memory 104 shown in FIG. 3, block 754 shown in FIG. 13 may direct the operator interface processor 100 shown in FIG. 3 to produce signals for causing audio represented by the audio information stored in the left audio field 706 to be output by the left speaker of the headphones and to produce signals for causing audio represented by the audio information stored in the right audio field 708 to be output by the right speaker of the headphones. Accordingly, in various embodiments, an operator wearing the headphones and interacting with the operator interface 14 may experience an auditory representation or simulation of the auditory environment of the operator controllable device 12.

In various embodiments, an operator interacting with the operator interface 14 shown in FIG. 3 may experience a representation or simulation of the environment in which the operator controllable device 12 (in FIG. 2) is situated. In some embodiments, the operator may wish to control the operator controllable device 12 to cause the operator controllable device 12 to perform a task. To do so, the operator may take one or more actions via the operator interface 14 to control or alter the operation of the operator controllable device 12 in response to the representation of the environment or portions thereof received by the operator interface 14 and communicated to the operator. Block 756 may direct the operator interface processor 100 to receive operator interface sensor information representing the action taken by the operator via the operator interface 14 and to be used to control or alter the operation of the operator controllable device 12.

Receiving Operator Interface Sensor Information

In various embodiments, block 756 may direct the operator interface processor 100 to receive the operator interface sensor information from sensors of the operator interface 14 and to store a representation of the operator interface sensor information in the location 164 of the variable memory 104. In various embodiments, block 756 may direct the operator interface processor 100 to store the representation as one or more operator interface sensor frame records.

FIG. 14 depicts an exemplary operator interface sensor frame record 800 in accordance with one embodiment. The operator interface sensor frame record 800 includes an operator audio field 802 that may store a representation of audio information received from the microphone 112 and an IMU x-axis field 804 and an IMU z-axis field 806 that may store angle values which represent x-axis and z-axis orientations of the IMU 114. The operator interface sensor frame record 800 also includes first, second, and third potentiometer fields 808, 810, and 812 that may store respective representations of position information received from the potentiometers 108 and a haptic glove condition field 814 may store a representation of a condition of the haptic glove 116. The operator interface sensor frame record also includes a time field 816 that may store a representation of a time when the information stored in the fields 802-814 was sampled.

In various embodiments, block 756 may direct the operator interface processor 100 to query the microphone 112 and receive audio information from the microphone 112. In various embodiments the audio information may represent speech information received from an operator interacting with the operator interface 14. Block 756 may then direct the operator interface processor 100 to store the audio information in the operator audio field 802 of the operator interface sensor frame record 800 shown in FIG. 8.

In various embodiments, block 756 shown in FIG. 13 may direct the operator interface processor 100 to query the IMU 114 shown in FIG. 3 and receive values which represent an x-axis angle and a z-axis angle of an operator's head. Block 756 may direct the operator interface processor 100 to store the values in the IMU x-axis field 804 and IMU z-axis field 806 of the operator interface sensor frame record 800 shown in FIG. 14.

In various embodiments, the operator may begin moving their head using their neck to look more closely at the coffee cup displayed for them and so the operator may cause the values in the IMU x-axis field 804 and IMU z-axis field 806 of the operator interface sensor frame record 800 to represent a new head position.

In various embodiments, block 756 shown in FIG. 13 may direct the operator interface processor 100 to query the first and second potentiometers of the potentiometers 108 shown in FIG. 3 to determine an orientation of a shoulder of the operator and to query the third potentiometer to determine an orientation of an elbow of the operator. Block 756 may direct the operator interface processor 100 to receive from the first, second, and third potentiometers values which represent angles of the potentiometers. Block 756 may direct the operator interface processor 100 to store the values which represent angles of the first, second, and third potentiometers in the first, second, and third potentiometer fields 808, 810, and 812 respectively of the operator interface sensor frame record 800 shown in FIG. 14.

In various embodiments, the operator may have begun moving their arm to cause the operator controllable device 12 to reach out to a detected item (by way of example only, a coffee cup) from the environment of the operator controllable device 12, wherein a representation of the detected item is displayed to the operator via the operator interface 14 so that the operator can cause the operator controllable device 12 to interact with the item. The operator interface 14 may allow the operator to cause the values in the first, second, and third potentiometer fields 808, 810, and 812 of the operator interface sensor frame record 800 to reflect one or more new arm and shoulder positions to facilitate such interaction by the operator controllable device 12 to interact with the item.

In various embodiments, block 756 shown in FIG. 13 may direct the operator interface processor 100 to query the haptic glove 116 shown in FIG. 3 and receive a value from the haptic glove 116 representing a condition sensed by the glove. For example, in various embodiments, haptic glove 116 may provide a value between 0 and 100 wherein 0 corresponds to a closed condition and 100 corresponds to a fully open condition of an operator's hand within the haptic glove 116. Block 756 may direct the operator interface processor 100 to store the value received from the haptic glove 116 in the haptic glove condition field 814.

In various embodiments, the operator may begin opening their hand to cause the gripper of the operator controllable device 12 to open and so the operator may cause the values in the haptic glove condition field 814 of the operator interface sensor frame record 800 to reflect an opening hand.

Block 756 shown in FIG. 13 may direct the operator interface processor 100 shown in FIG. 3 to store a time associated with the operator interface sensor information represented by the information stored in the fields 802-814 in the time field 816. In the embodiment shown in FIG. 14, the operator interface sensor frame record 800 represents operator interface sensor information that was sensed shortly after the environment sensor information, possibly on the order of a hundredth of a second, represented by the device environment frame record 700 shown in FIG. 12 was sensed.

Deriving Device Control Information

Block 758 shown in FIG. 13 then directs the operator interface processor 100 to derive device control information from the operator interface sensor information, comprising one or more action-based instructions and one or more associated action-oriented time representations. The device control information may therefore characterize data to cause the operator controllable device 12 to simulate or replicate the at least one action taken by the operator. In various embodiments, block 758 may direct the operator interface processor 100 to store a representation of the device control information in the location 166 of the variable memory 104. The representation of the device control information may include one or more device control information frame records, each representing action-based instructions associated with a time.

An exemplary device control information frame record according to one embodiment is discussed above and shown at 300 in FIG. 5. The exemplary device control information frame record 300 includes a speaker control field 302 that may store audio information to be output by a speaker such as the speaker 52 of the operator controllable device 12 shown in FIG. 2. The exemplary device control information frame record 300 also includes first, second, third, fourth, fifth and sixth motor control fields 304, 306, 308, 310, 312, and 314 that may store motor control instructions for controlling motors such as the first, second, third, fourth, fifth, and sixth servomotors of the motors 48 of the operator controllable device 12 shown in FIG. 2. In the embodiment shown, the motor control instructions represent a desired position of a motor. The device control information frame record also includes a time field 316 which may store a time associated with the action-based instructions represented by the fields 302-314.

In various embodiments, block 758 of FIG. 13 may direct the operator interface processor 100 shown in FIG. 3 to derive information for the fields 302-314 of the exemplary device control information frame record 300 shown in FIG. 5 from fields of an operator interface frame record, such as the fields 802-814 of the operator interface sensor frame record 800 shown in FIG. 14.

For example, in various embodiments, block 758 of FIG. 13 may direct the operator interface processor 100 shown in FIG. 3 to copy audio information stored in the operator audio field 802 of the operator interface sensor frame record 800 shown in FIG. 14 into the speaker control field 302 of the exemplary device control information frame record 300 shown in FIG. 5. Block 758 may direct the operator interface processor 100 to copy the values representing angles from the potentiometer fields 808, 810, and 812 of the operator interface sensor frame record 800 into the first, second, and third motor control fields 304, 306, and 308 of the device control information frame record 300.

In various embodiments, block 758 may direct the operator interface processor 100 to copy the angle values from the IMU x-axis field 804 and the IMU z-axis field 806 of the operator interface sensor frame record 800 into the fourth and fifth motor control fields 310 and 312 of the exemplary device control information frame record 300.

In various embodiments, block 758 may direct the operator interface processor 100 to scale the value stored in the haptic glove condition field 814 by a scaling factor to produce a desired position value that may act as motor control instructions and to store the desired position value in the sixth motor control field 314.

In various embodiments, other functions besides copying and scaling may be used to derive the device control information. In various embodiments, block 758 may direct the operator interface processor 100 to apply audio encoding, vocoders or vocal encoders, text-to-speech and/or speech-to-text functions to the operator interface sensor information on the fly. In various embodiments, a voice of an operator may be modulated, for example by sending the voice through a vocoder or vocal encoder, to produce a variety of voices.

In some embodiments, block 758 may direct the operator interface processor 100 to apply transformations to the operator interface sensor information when deriving device control information which may filter actions taken by the operator controlled device as a result of the device control information. For example, in one embodiment a non-linear response function may be applied to the operator interface sensor information, such as. For example, the non-linear response function may scale down the operator interface sensor information when deriving the device control information if the operator is approaching a limit of the environment and/or the operator controllable device. This may slow movement of the operator controllable device 12 towards a limit, when the operator controllable device nears the limit. The limit or end of range of extension of a particular servo may be defined to generally mimic the range of the analogous joint in a human.

For example, in one embodiment the operator may extend their right arm with a particular speed and in a particular direction and as a result of instructions from the operator interface 14 an arm on the operator controllable device 12 will also extend its arm in the same or similar speed and direction. As the operator controllable device approaches the limit or end of its range of extension, the velocity of operator controllable device right arm may be scaled down by modifying action-based instructions being generated from actions of the operator at the operator interface 14 to slow the speed of arm extension of the operator controllable device 12. In various embodiments the speed of extension of the arm of the operator interface 14 may not change even though the speed of extension of the comparable arm of the operator controllable device 12 is scaled down.

Sending Device Control Information

Block 760 of the flowchart 750 shown in FIG. 13 then directs the operator interface processor 100 shown in FIG. 3 to send the device control information to the operator controllable device 12 shown in FIG. 1. In various embodiments, block 760 may direct the operator interface processor 100 to retrieve a representation of the device control information from the location 166 of the variable memory 104 and to send the representation to the operator controllable device 12 via the I/O interface 120 and the network 18.

Operation of Flowcharts 200 and 901

In some embodiments, blocks 902 and 904 of the flowchart 901 shown in FIG. 15 may be executed continuously and blocks 206, 207, and 208 of the flowchart 200 shown in FIG. 4 may be executed continuously and concurrently with blocks 902 and 904. In some embodiments blocks 752 and 754 of the flowchart 750 shown in FIG. 13 may be executed continuously and blocks 756, 758 and 760 may be executed continuously and concurrently with blocks 752 and 754.

In various embodiments, the operator may cause the operator controllable device 12 to interact with features of its environment. For example, in various embodiments, a feature may be considered to be any aspect of the environment. For example, in various embodiments, the flowcharts 200, 901, and 750 may facilitate the operator to cause the operator controllable device 12 to pick up a coffee cup and/or set the coffee cup down.

In some embodiments, blocks similar to blocks 902 and 904 of the flowchart 901 may direct the device processor 40 to receive and send a subset of the sensor information. In some embodiments, blocks 206, 207, and 208 may direct the device processor 40 to receive a subset of the device control information.

Similarly, in some embodiments, blocks 752 and 754 of the flowchart 750 shown in FIG. 13 may direct the operator interface processor 100 to receive a subset of the environment sensor information and to produce a subset of operator interface control signals. In some embodiments, blocks 756, 758, and 760 may direct the operator interface processor 100 to receive a subset of operator interface sensor information and derive and send a subset of device control information to the operator controllable device 12.

In some embodiments, where subsets of information are being sent, more than one flowchart generally similar to the flowchart 901, more than one flowchart generally similar to the flowchart 200, and more than one flowchart generally similar to the flowchart 750 may be executed concurrently by one or more processor circuits acting as the processor circuits shown in FIGS. 2 and 3.

Analogous Control—Overview of Devices

In various embodiments, the operator controllable device 12 may include sensors, actuators and/or output systems that are directly analogous or analogous to the perception and/or actuation or output systems of an operator. In the case where an operator is human, for example, directly analogous devices may include grippers that generally represent or are analogous to human hands, cameras in the visible spectrum that generally represent or are analogous to human eyes, microphones that generally represent or are analogous to human ears, touch sensors that generally represent or are analogous to human touch, and/or speakers that generally represent or are analogous to human vocal apparatus.

In various embodiments, data obtained from analogous control of a device may comprise perception and actuation or output data. Generally an operator observes representations of the perception data—for example, video, audio or haptic feedback data representing an environment of a robotic system or apparatus—and then acts in response to this perception data. These actions may cause actuation or output systems or devices to take action.

Referring back to FIG. 1, in some embodiments, the operator interface 14 may control the operator controllable device 12 to cause the operator controllable device 12 to perform a task. In various embodiments, the task may be one that the operator is familiar with performing without use of the operator controllable device 12. In various embodiments where the operator is a human being, the task may be an activity commonly done by a human being, such as, by way of example only, pick up a cup of coffee or another item, object, or thing.

In various embodiments, the operator controllable device 12 may include sensors to sense or detect an environment of the operator controllable device 12 or aspect of that environment and to produce environment sensor information representing the environment or aspects of that environment. The operator controllable device 12 may be directed to send the environment sensor information to the operator interface 14, such as, for example, over the network 18.

The operator interface 14 may be directed to receive the environment sensor information and to derive operator interface control signals from the first environment sensor information. In some embodiments, the operator interface control signals include data to cause the operator interface 14 to simulate the environment of the operator controllable device 12 or aspects of that environment for an operator interacting with the operator interface 14.

The operator interacting with the operator interface 14 may take action in response to a simulation the operator controllable device environment within or at operator interface 14, and the operator interface 14 may include sensors to detect the action taken by the operator. The operator interface 14 may be directed to receive operator interface sensor information via the sensors of the operator interface 14. The operator interface sensor information may represent one or more actions taken by the operator in response to the simulation the operator controllable device environment within or at operator interface 14.

In various embodiments, the operator interface 14 may be directed to derive device control information, comprising one or more action-based instructions and one or more associated action-oriented time representations, from operator interface sensor information and to send the device control information to the operator controllable device 12. In some embodiments, the device control information may cause the operator controllable device to simulate or replicate at least one action taken by the operator.

Thus, in various embodiments, the system 10 facilitates providing a simulation of an environment for the operator controllable device 12 within or at the operator interface 14 for an operator and the operator controllable device simulates actions taken by the human operator in response to being provided with the simulation of the environment.

Referring to FIG. 2, in some embodiments, the sensors and actuator and/or output devices of the operator controllable device 12 (i.e., the cameras 46, motors 48, microphones 50, and speaker 52) may be positioned and oriented to sense and react to an environment of the operator controllable device 12 in an analogous way to a human being.

In various embodiments, the cameras 46 may act analogously to an operator's eyes and include first and second cameras spaced apart to provide binocular vision information. In various embodiments, the operator controllable device 12 may include a mechanical neck controllable by one or more of the motors 48 that may act analogously to an operator's neck. The motors 48 may include first and second servomotors which act as neck servomotors to control the mechanical neck, which is connected to the cameras 46 such that movement of the neck servomotors moves a target area or orientation of the cameras 46.

In various embodiments, the microphones 50 may act analogously to an operator's ears and may include two microphones positioned and oriented compared to the cameras 46, generally analogously to how ears are positioned and oriented compared to eyes on a human being. The speaker 52 may act analogously to an operator's vocal apparatus (i.e., to provide speech communication capabilities) and may be positioned and oriented compared to the cameras 46 and the microphones 50 analogously to how a mouth is positioned and oriented compared to eyes and ears of a human being.

In various embodiments, the operator controllable device 12 may include a mechanical arm including a mechanical shoulder with two degrees of freedom and an elbow with one degree of freedom and a gripper or end effector. The mechanical shoulder, elbow, and gripper may be controllable by one or more of the motors 48 to cause the mechanical arm and gripper to act analogously to an operator's arm and hand. In various embodiments, the motors 48 may include third and fourth servomotors acting as shoulder servomotors to control a mechanical shoulder of the mechanical arm, a fifth servomotor acting as an elbow servomotor to control an elbow of the mechanical arm, and a sixth servomotor acting as a gripper servomotor to control a gripper attached to the end of the mechanical arm.

Referring to FIG. 3, in some embodiments, the sensors and actuator and/or output devices of the operator interface 14 (i.e., the displays 106, potentiometers 108, microphone 112, and speakers 110) may be interacted with by a human operator such that the operator is able to experience and react to a representation or simulation of an environment sensed by the operator controllable device 12 shown in FIG. 2.

In various embodiments, operator interface 14 may include a virtual reality headset, such as, for example an OCULUS RIFT®, from OCULUS VR, LLC of Menlo Park, Calif., USA, wearable by the operator. The virtual reality headset may include left and right displays, which may act as the displays 106, to display left and right images to left and right eyes of an operator. The virtual reality headset may include the IMU 114, which may be mounted on the operator's head and sense position and orientation of the operator's head.

The operator interface 14 may include an operator wearable arm and shoulder mount to which the potentiometers 108 are connected. The potentiometers may include first and second potentiometers to measure a shoulder position of the operator and a third potentiometer to measure an elbow position of the operator.

The operator interface 14 may include headphones which may act as the speakers 110 and include left and right speakers. The microphone 112 may be mounted to the headphones and sense speech from a vocal apparatus of the operator. The haptic glove 116 may be sense movement and orientation of a hand of the operator.

All references, including patent applications, patents, and publications, cited herein are hereby incorporated by reference to the same effect as if each reference were individually indicated to be incorporated by reference.

While specific embodiments of the invention have been described and illustrated, such embodiments should be considered illustrative of the invention only and not as limiting the invention as construed in accordance with the accompanying claims.

The embodiments of the invention in which an exclusive property or privilege is claimed are defined as follows:

1. A method of conditioning one or more actions related to an operator controllable device, the method comprising:
   receiving, from an operator interface in communication with the operator controllable device via a network, one or more action-based instructions representing one or more operator controllable device actions associated with the operator controllable device;
   receiving one or more action-oriented time representations representing one or more times associated with the one or more respective action-based instructions;
   deriving at least one conditioned action-based instruction for a predicted action time subsequent to the one or more times represented by the received one or more action-oriented time representations,
      wherein the predicted action time is a time at which the derived at least one conditioned action-based instruction is predicted to be received by the operator controllable device based at least in part on at least one of a condition of the network or a complexity of a task performed by the operator controllable device; and
   producing at least one signal representing the at least one conditioned action-based instruction, which when executed, causes the operator controllable device to take the one or more conditioned actions at the predicted action time.

2. The method according to claim 1, wherein deriving the at least one conditioned action-based instruction comprises predicting at least one future action-based instruction predicted to be received.

3. The method according to claim 1, wherein deriving the at least one conditioned action-based instruction comprises deriving at least one time based function from the received one or more action-based instructions and the one or more action-oriented time representations.

4. The method according to claim 3, wherein deriving the at least one time based function comprises fitting the at least one time based function to the one or more action-based instructions and associated one or more action-oriented time representations.

5. The method according to claim 4, wherein deriving the at least one conditioned action-based instruction comprises applying the at least one time based function to the predicted action time subsequent to the one or more times.

6. The method according to claim 5, wherein deriving the at least one conditioned action-based instruction comprises averaging a plurality of results of applying the at least one time based function to the predicted action time subsequent to the one or more times.

7. The method according to claim 3 wherein deriving the at least one time based function from the received one or more action-based instructions and the one or more action-oriented time representations comprises deriving at least one polynomial function.

8. The method according to claim 1, wherein the one or more times represented by the one or more action-oriented time representations are earlier than a current time by a time difference.

9. The method according to claim 8, wherein the time difference includes a transmission time difference corresponding to a time associated with transmitting the one or more action-based instructions from the operator interface to the operator controllable device.

10. The method according to claim 1, wherein the operator controllable device is controlled by an operator via the operator interface separate from and in communication with the operator controllable device.

11. The method according to claim 1, wherein the one or more action-based instructions and the one or more action-oriented time representations are processed by the operator controllable device in order to derive the at least one conditioned action-based instruction and in order to cause the operator controllable device to take the one or more conditioned actions.

12. The method of claim 1, wherein said at least one conditioned action-based instruction when executed, causes the operator controllable device to take the one or more conditioned actions subsequent to taking actions corresponding to the one or more operator controllable device actions.

13. The method of claim 1 wherein the predicted action time is equivalent to a representation of a current time plus a time step that is dependent on at least one of the condition of the network or the complexity of a task performed by the operator controllable device.

14. The method of claim 13 wherein the predicted action time is dependent on at least one of network latency or packet loss.

15. The method of claim 1 wherein the predicted action time is equivalent to a representation of a current time plus a time step that is equal to the network latency of the network.

16. The method of claim 1 wherein the predicted action time is equivalent to a representation of a current time plus a time step that is proportional to a minimum transmission time delay between the operator interface and the operator controllable device.

17. The method of claim 1 wherein the predicted action time is equivalent to a representation of a current time plus a time step that is proportional to a sum of a fixed and a variable time step.

18. The method of claim 1 wherein deriving the at least one conditioned action-based instruction comprises deriving a plurality of time based polynomial functions, each of the plurality of time based polynomial functions having a different degree than any other of the plurality of time based polynomial functions.

19. The method of claim 18 wherein deriving the at least one conditioned action-based instruction comprises deriving at least one conditioned actioned-based instruction based at least in part on a weighted average of the plurality of time based polynomial functions.

20. The method of claim 1, further comprising applying at least one filter to the at least one conditioned action-based instruction.

21. The method of claim 20 wherein applying at least one filter comprises applying at least one of a linear filter or a Kalman filter.

22. A system, comprising:
an operator controllable device;
at least one nontransitory processor-readable storage medium that stores at least one of instructions or data; and
at least one processor operatively coupled to the operator controllable device and the at least one nontransitory processor-readable storage medium, in operation, the at least one processor:
receives, from an operator interface via a network, one or more action-based instructions representing one or more operator controllable device actions associated with the operator controllable device;
receives one or more action-oriented time representations representing one or more times associated with the one or more respective action-based instructions;
derives at least one conditioned action-based instruction for a predicted action time subsequent to the one or more times represented by the received one or more action-oriented time representations, wherein the predicted action time is a time at which the derived at least one conditioned action-based instruction is predicted to be received by the operator controllable device based at least in part on at least one of a condition of the network or a complexity of a task performed by the operator controllable device; and
produces at least one signal representing the at least one conditioned action-based instruction, which when executed, causes the operator controllable device to take the one or more conditioned actions at the predicted action time.

23. The system of claim 22 wherein the at least one processor applies at least one filter to the at least one conditioned action-based instruction.

24. The system of claim 23 wherein the at least one filter comprises at least one of a linear filter or a Kalman filter.

25. The system of claim 22 wherein, to derive the at least one conditioned action-based instruction, the at least one processor derives at least one time based function from the received one or more action-based instructions and the one or more action-oriented time representations.

\* \* \* \* \*